United States Patent [19]

Vishwakarma et al.

[11] Patent Number: 5,674,670

[45] Date of Patent: Oct. 7, 1997

[54] 2-HYDROXYPHENYL BENZOTRIAZOLE BASED UV ABSORBING POLYMERS WITH PARTICULAR SUBSTITUENTS AND PHOTOGRAPHIC ELEMENTS CONTAINING THEM

[75] Inventors: Lal Chand Vishwakarma; Hwei-Ling Yau, both of Rochester; Tienteh Chen, Penfield, all of N.Y.

[73] Assignee: Eastman Kodak Company, Rochester, N.Y.

[21] Appl. No.: 617,447

[22] Filed: Mar. 18, 1996

[51] Int. Cl.$^6$ .................................................. G03C 1/815
[52] U.S. Cl. ................... 430/512; 430/627; 430/931; 524/91; 526/259; 548/259; 548/260
[58] Field of Search ........................... 430/512, 627, 430/931; 526/259; 524/91; 548/259, 260

[56] References Cited

U.S. PATENT DOCUMENTS

| | | | |
|---|---|---|---|
| 3,004,896 | 10/1961 | Heller et al. | 167/90 |
| 3,072,585 | 1/1963 | Milionis et la. | 260/22 |
| 3,493,539 | 2/1970 | Skoultchi et al. | 260/47 |
| 3,761,272 | 9/1973 | Mannens et al. | 96/84 |
| 3,813,255 | 5/1974 | Mannens et al. | 117/33.3 |
| 4,496,650 | 1/1985 | Yagihara et al. | 430/381 |
| 4,663,272 | 5/1987 | Nakamura | 430/542 |
| 4,716,234 | 12/1987 | Dunks et al. | 526/259 |
| 4,943,519 | 7/1990 | Helling et al. | 430/512 |
| 5,099,027 | 3/1992 | Vogl et al. | 526/259 |
| 5,372,922 | 12/1994 | Schofield et al. | 430/572 |
| 5,384,235 | 1/1995 | Chen et al. | 430/512 |
| 5,455,152 | 10/1995 | Vishwakarma | 430/512 |

FOREIGN PATENT DOCUMENTS

| | | |
|---|---|---|
| 190 003 | 1/1986 | European Pat. Off. . |
| 6-3055-542 | 3/1988 | Japan . |
| 0-3223-384 | 1/1990 | Japan . |

*Primary Examiner*—Richard L. Schilling
*Attorney, Agent, or Firm*—Edith A. Rice

[57] ABSTRACT

A photographic element comprising a light sensitive portion and an ultraviolet absorbing polymer comprising repeating units of a 2'-hydroxphenyl benzotriazole with a 5- or 6-substituent selected from halogen, cyano, carboxy or a sulfonyl, and a 4'-alkoxy group in which the alkylene portion of the alkoxy is linked, in sequence through a first optional bivalent linking group, then an oxygen, sulfur or amino group, then a second optional bivalent linking group, to the polymer chain, provided that the 3'-position is unsubsituted and the 4'-substituent does not have any —NH—, —OH or —SH substituents.

24 Claims, 1 Drawing Sheet

2-HYDROXYPHENYL BENZOTRIAZOLE BASED UV ABSORBING POLYMERS WITH PARTICULAR SUBSTITUENTS AND PHOTOGRAPHIC ELEMENTS CONTAINING THEM

FIELD OF THE INVENTION

This invention relates to particular substituted benzotriazole based UV absorbing monomers, and photographic elements containing UV absorbing polymers formed from them.

BACKGROUND

Typical photographic elements use silver halide emulsions (although other light sensitive materials have been known), silver halide having a native sensitivity to ultraviolet radiation. Ultraviolet radiation ("UV") as used in this application means light having a wavelength of 300–400nm. Such UV sensitivity is usually undesirable in that it produces an image on the photographic element which is not visible to the human eye. Furthermore, the image dyes in the color photographs are known to fade due to action of UV light. Also other organic molecules such as unused color forming couplers in the emulsion layers and optical brightners in the paper support degrade due to action of UV light and generate undesirable color stains on the finished photographs. Therefore, photographic elements typically contain a UV absorbing compound (sometimes referred to simply as a "UV absorber"). Another function of UV absorbers is to prevent the formation of undesirable patterns caused by electrostatic discharge in silver halide photographic materials. In general, UV absorbers impart light stability to organic molecules in various products which are susceptible to degrade as a result of the action of UV.

Generally, an effective UV absorber should have its peak absorption above a wavelength of 320 nm. The absorption peak may be at a longer wavelength, as long as absorption drops off sufficiently as it approaches the visual range (approximately 400 to 700nm) so that no visible color is shown by the compound. In addition, to be effective, a UV absorber should have a high extinction coefficient in the desired wavelength range. However, for the most desirable UV protection, the high extinction coefficient should be at those wavelengths sufficiently below the visual range so that the compound should not be visually yellow.

Both conventional and polymeric UV absorbers have been used in photographic elements. Examples of conventional (that is, non-polymeric) UV absorbing compounds are shown by formula (III A) and (III B) below, currently used in color paper as a mixture have the following structures.

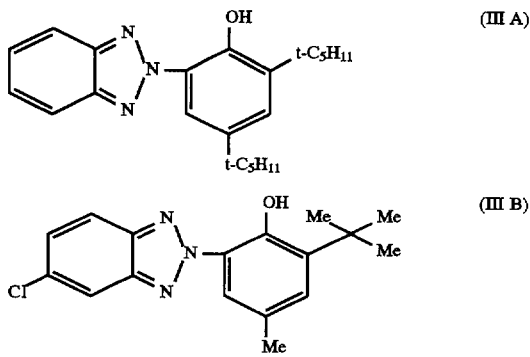

It has however, been observed that these compounds and other non-polymeric UV absorbers have a propensity to crystallize out in the coatings. This results in migration of the compound to the surface causing an undesirable blooming effect. Recently, it has been suggested that such compounds are associated with high health risk factors.

It is known that polymer latexes obtained by polymerization of UV absorbing monomers, can be utilized as UV absorbing agents which do not have many of the disadvantages associated with non-polymeric UV absorbers. Photographic performance advantages of UV absorbing polymer latexes have been described, for example in U.S. Pat. No. 5,384,235. That patent discloses a polymerizable 2'-hydroxyphenyl benzotriazole having a 5'-position substituent on the 2'-hydroxyphenyl ring chromophore.

U.S. Pat. No. 3,493,539 discloses synthetic solid polymers (that is, plastic materials) containing UV absorbers of the 2'-hydroxyphenyl benzotriazole type. The disclosed UV absorbers for such use can include those formed from monomers having a 4'-alkoxy substituent with an alkylene group of the alkoxy linked through an intervening oxygen to a polymerizable group. Photographic elements with UV absorbing polymers made with somewhat similar monomers are also disclosed in U.S. Pat. No. 5,372,922, U.S. Pat. No. 4,943,519 and Japanese published patent application (Kokai) JP 63-55542. However, the disclosed compounds typically either have —OH groups on the 4'-substituent or no substituents on the benzene ring of the benzotriazole, or have particular 3'-substituents (such as methyl). Polymeric UV absorbers formed from such disclosed compounds can exhibit poor performance in photographic elements in one or more of the following characteristics: UV absorption characteristics, intrinsic stability, stabilizing effect on image dyes in the element, light-induced yellowing, or other photographic properties.

It is desirable then to provide a UV absorbing polymer and photographic elements containing a UV absorbing polymer, which polymer contains units formed from a 2'-hydroxyphenyl benzotriazole monomer, and which has good stability in a photographic element environment as well as a high extinction co-efficient and a UV absorption which drops rapidly at or near 400 nm and exhibit little or no yellow coloration.

SUMMARY OF THE INVENTION

The present invention provides an ultraviolet absorbing polymer comprising repeating units of a 2'-hydroxphenyl benzotriazole with a 5- or 6-substituent selected from halogen, cyano, carboxy or a sulfonyl, and a 4'-alkoxy group in which the alkylene portion of the alkoxy is linked, in sequence through a first optional bivalent linking group, then an oxygen, sulfur group or amino group, then a second optional bivalent linking group, to the polymer chain, provided that the 3'-position is unsubsituted and the 4'-substituent does not have any —NH—, —OH or —SH substituents. Photographic elements comprising a light sensitive portion and the foregoing type of UV absorbing polymer are also provided.

An ultraviolet absorbing polymer of the foregoing type when used in a photographic element, has good stability as well as a high extinction co-efficient and a UV absorption which drops rapidly at or near 400 nm, and exhibits little or no yellow coloration.

DRAWINGS

EMBODIMENTS OF THE INVENTION

Figure 1:
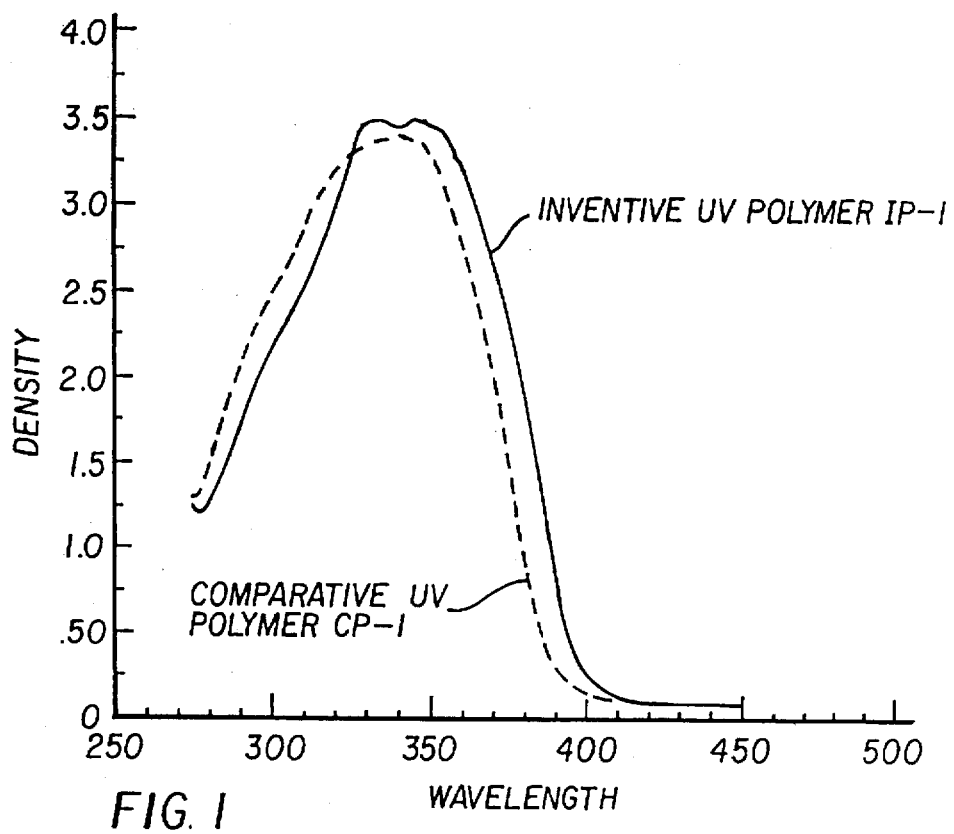
FIG. 1 represents fresh coated absorption spectra of UV absorbing polymers, IP-1 (inventive) and CP-1 (comparative), showing the higher absorption of the inventive polymer in the region between about 360–400 nm.
Figure 2:
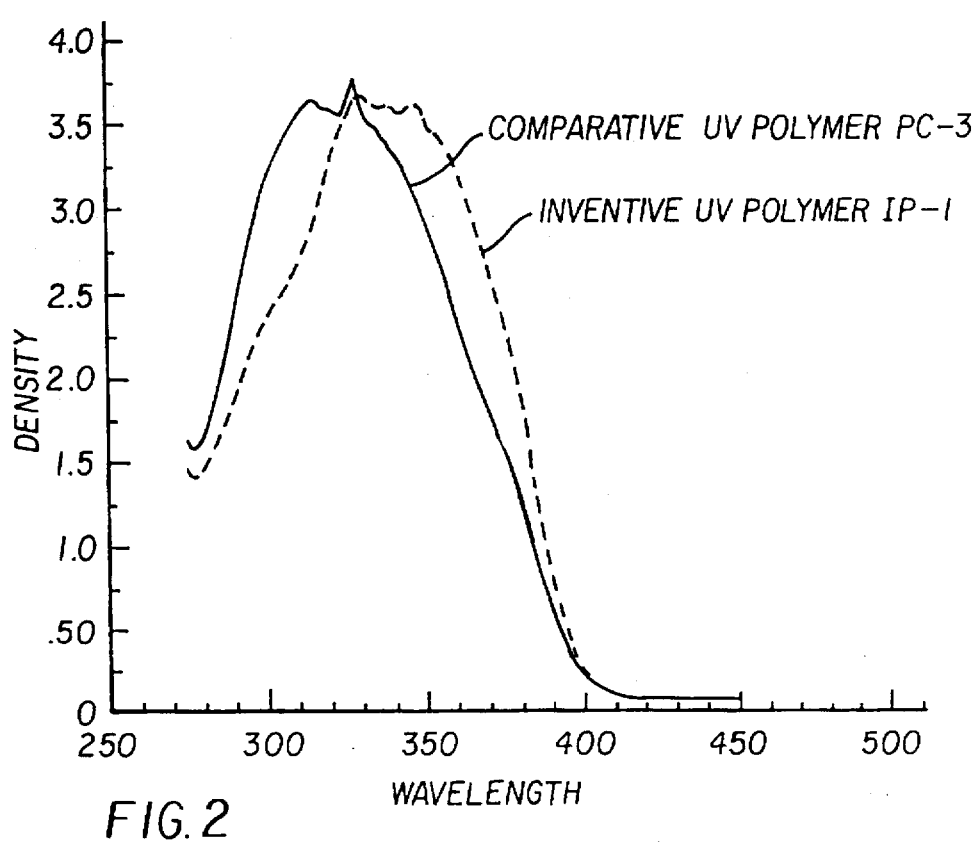
FIG. 2 represents fresh coated absorption spectra of UV absorbing polymers, IP-1 (invention) and CP-3 (comparative), showing the higher absorption of the inventive polymer in the region between about 340–400 nm.

By reference to "under", "above", "below", "upper", "lower" or the like terms in relation to layer structure of a photographic element, is meant in this application, the relative position in relation to light when the element is exposed in a normal manner. "Above" or "upper" would mean closer to the light source when the element is exposed normally, while "below" or "lower" would mean further from the light source. Since a typical photographic element has the various layers coated on a support, "above" or "upper" would mean further from the support, while "below" or "under" would mean closer to the support. It will also be understood that reference to any broader formula includes reference to compounds with a narrower formula within the broader formula (for example, reference to compounds of formula (I) having particular substituents includes the possibility of compounds of formula (II) having the same substituents unless otherwise indicated).

In reference to "polymers" having units formed from monomers of formula (I) (as already discussed, this includes any compounds falling within formula (I), such as compounds of formula (II), this means that the compound would contain at least 10 (and preferably at least 20 and more preferably at least 50) repeating units of the monomer of formula (I). Typically the polymers would have hundreds (for example, three hundred or more) or several thousand (for example, three thousand or more) repeating units.

For a compound to be considered a UV absorbing polymer in the present invention, it should at least absorb somewhere in the 300 to 400 nm region of the spectrum. When reference in this application is made to a substituent "group", this means that the substituent may itself be substituted or unsubstituted (for example "alkyl group" refers to a substituted or unsubstituted alkyl). Generally, unless otherwise specifically stated, substituent groups usable on molecules herein include any groups, whether substituted or unsubstituted, which do not destroy properties necessary for the photographic utility. However, preferably such substituents will not have any unsaturated carbon-carbon bonds since these may cause cross polymerization during polymerization of the corresponding monomer.

Examples of substituents on any of the mentioned groups can include known substituents, such as the following except where otherwise excluded: halogen, for example, chloro, fluoro, bromo, iodo; alkoxy, particularly those "lower alkyl" (that is, with 1 to 6 carbon atoms, for example, methoxy, ethoxy; substituted or unsubstituted alkyl, particularly lower alkyl (for example, methyl, trifluoromethyl); thioalkyl (for example, methylthio or ethylthio), particularly either of those with 1 to 6 carbon atoms; substituted and unsubstituted aryl, particularly those having from 6 to 20 carbon atoms (for example, phenyl); and substituted or unsubstituted heteroaryl, particularly those having a 5 or 6-membered ring containing 1, 2 or 3 heteroatoms selected from N, O, or S (for example, pyridyl, thienyl, furyl, pyrrolyl); and others known in the art. Alkyl substituents may specifically include "lower alkyl" (that is, having 1–6 carbon atoms), for example, methyl, ethyl, and the like. Further, with regard to any alkyl group or alkylene group, it will be understood that these can be branched or unbranched and include ring structures.

It will also be understood throughout this application that reference to a compound of a particular general formula includes those compounds of other more specific formula which specific formula falls within the general formula definition.

The 2'-hydroxyphenyl benzotriazole repeating units of the ultraviolet absorbing polymer are of formula (I):

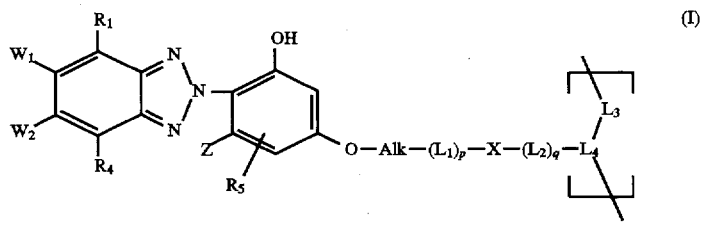

wherein:

$R_1$, $R_4$, $W_1$, $W_2$ and $R_5$ are, indepedently, H, halogen, cyano, carboxy group, carbamoyl group, sulfoxido group, sulfono group, sufonato group, sulfonomido group, alkyl group, alkoxy group, aryl group, heteroaryl group, or aryloxy group, or any two or more of $R_1$, $R_4$, $W_1$ and $W_2$ may together form an alicyclic, aromatic or heteroaromatic group; provided that at least $W_1$ or $W_2$ is halogen, cyano, carboxy or sulfonyl;

Z is H or an OH;

Alk is an alkylene group;

$L_1$ and $L_2$ are, independently, bivalent linking groups;

X is O, S or an amino group;

$L_3$ is a methylene group and and $L_4$ is a methine group; and wherein the 4'-substituent which does not have any —NH—, —OH or —SH substituents, is the group:

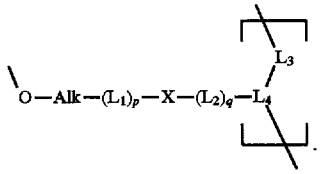

Units of formula (I) may particularly be of formula (IA) or (IB):

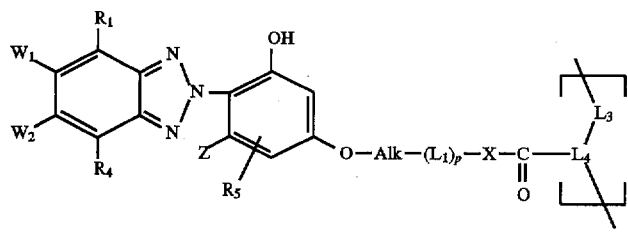

(IA)

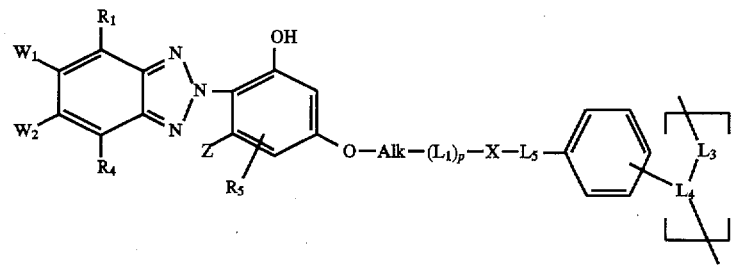

(IB)

wherein L$_5$ is a methylene group, carbonyl or SO$_2$.

W$_2$ in the above formula (I) is preferably a halogen or alkoxy such that the units of formula (I) are then of formula (IC) or (ID) below:

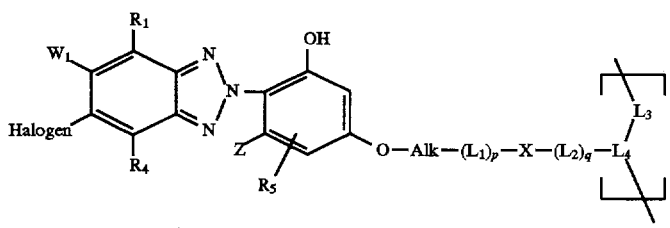

(IC)

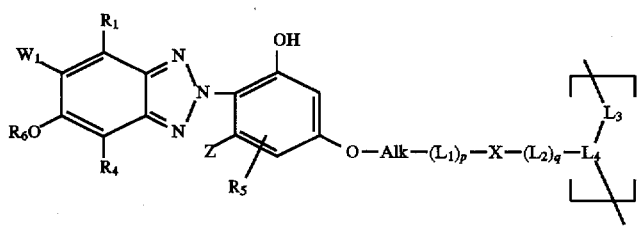

(ID)

wherein "Halogen" represents a halogen and R$_6$ is an alkyl group. In the above formula (IC) or (ID) R$_1$ and W$_1$ may together form a ring as described above but W$_2$, which in the above formula (IC) and (ID) is halogen or R$_6$O, does not form part of a ring with other substituents on the benzene ring (nor does R$_4$).

In any of the above formula q may preferably be 1 with —L$_2$— preferably being:

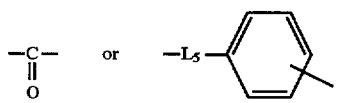

When —L$_2$— is the carbonyl group shown, then formula (IC) and (ID) respectively become formula (IC') and (ID') below:

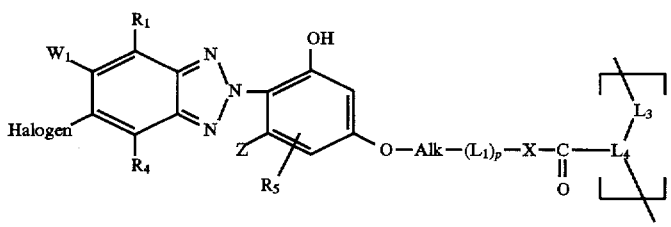

(IC')

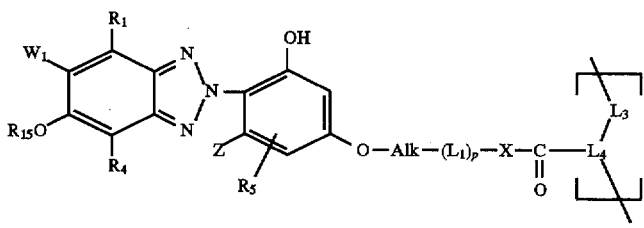

(ID')

Most preferably the units of formula (I) are of the following formula (II):

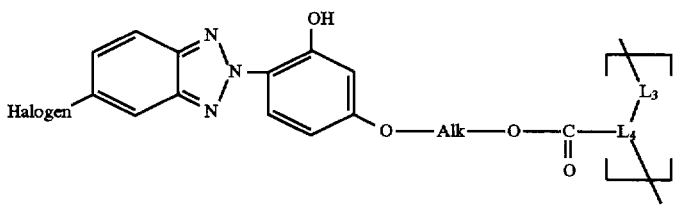

(II)

Substituents represented by $R_1$, $R_4$, $W_1$, $W_2$ or $R_5$ may, for example, be any of the following where allowed in each of the above (or below) formula: a 1 to 18 carbon alkyl (or 1 to 6, or 1 to 2 carbon alkyl), aryl (such as 6 to 20 carbon atoms, for example a phenyl group), heteroaryl (such as pyrrolo, furyl or thienyl), aryloxy (such as 6 to 20 carbon atoms) alkoxy (such as to 6 or 1 to 2 carbon alkoxy), cyano, or halogen (for example F, Cl, Br, or I, but particularly having Cl on the benzo ring for $W_1$ and/or $W_2$, and/or at the 5' position on the 2'-hydroxyphenyl ring). Substituents represented by $R_1$, $R_4$, $W_1$, and $W_2$ can also include a ring fused thereto, such as a benzo, pyrrolo, furyl or thienyl ring as long as the proviso already defined for $W_1$ and $W_2$ is met (that is, provided that at least $W_1$ or $W_2$ is halogen, cyano, carboxy or sulfonyl). Any of the alkyl and alkoxy substituents may have from 1 to 5 (or 1 to 2) intervening oxygen, sulfur or nitrogen atoms.

Preferably, in any of the above formula, $R_1$, $R_4$, $W_1$, $W_2$ or $R_5$ are, independently, an alkyl group or alkoxy group (particularly either of such groups having 1 to 20 carbon atoms), H or halogen. $R_1$, $R_4$, $W_1$, $R_5$ and Z are further preferably all H.

"Alk" in any of the formulae for the ultraviolet absorbing polymer, may particularly be an alkylene substituted by halogen or substitued by: alkyl, alkoxy, alkyl sulfide, aryl, aryloxy, or dialkyl amino. However, "Alk" is preferably an unsubstituted alkylene, particularly $CH_2CH_2$.

As already described, in the above formulas, $L_1$ and $L_2$ are, independently any bivalent linking group. Preferably $L_1$ and $L_2$ are both an alkylene group or alkylene group interrupted by oxygen, nitrogen or sulfur atoms (for example, —O—, —NR— where R is H or an alkyl group such as a lower alky group, or an —$SO_2$—), or by carbonyl. $L_1$ and $L_2$ may particularly have 1 to 20 carbon atoms, more particularly 4 to 12 carbon atoms, in total, and 1 to 5 heteroatoms selected from O, N or S. It will be understood that $L_1$ and $L_2$ include the possibility of either of them being unbranched linear or branched, or being cyclic. $L_1$ or $L_2$ may also, for example, be a carbonyl. Examples of a linking group for $L_1$ or $L_2$ include —$CH_2CH_2$—, —$CH_2CH_2CH_2$—, —$CH_2CH_2OCH_2CH_2$—, —$CH_2CH_2NHCH_2CH_2$—, —$CH_2CH(OR)CH_2$—, —$CH_2CH_2OC(O)CH_2CH_2$—, —$CH_2CH_2NHCOCH_2CH_2$—, —$CH_2CH_2OCH_2CH_2OCH_2CH_2$—, —Phenyl—, cyclohexyl group, or any of the foregoing in which one or more H is replaced by substituents as described above (R in the foregoing formulae being alkyl group or aryl group). Particular examples of $L_1$ also include

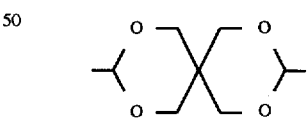

or

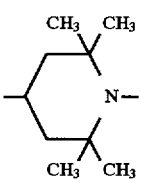

or

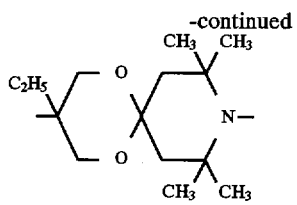

Particular examples of $L_2$ include CO, $CONH(CH_2)_3$ NHCO, benzyl, benzenesulfonyl, $(CH_2)_nCO$ and $(CH_2OCH_2)_nCO$ (where, n may be 1–8). However, in the case of $L_2$ it is preferably a benzyl group (as shown in formula (IB) above wherein $L_5$ is preferably $CH_2$, a carbonyl group, or a sulfonyl group).

X, as already mentioned, can be oxygen, sulfur group or amino group. Sulfur group includes —S—, —$SO_2$— or —$S(R)_2$—. Amino group includes —NR—. In either —S$(R)_2$— or —NR—, R can be H, an alkyl group such as a lower alky group, aryl group, or a heteroaryl group.

Examples of any of the alkyl groups mentioned in relation to any of the formula herein, include a methyl group, an ethyl group, an n-propyl group, an iso-propyl group, a butyl group, a tert-butyl group, an n-amyl group, an n-octyl group, a tert-octyl group, a methoxyethyl group, an ethoxyethyl group, a hydroxyethyl group, or a cyanoethyl group. Particular halogens where such are possible in any of the formula described herein, include fluorine, chlorine or bromine. Any aryl group includes, for example, a phenyl group, a tolyl group, a mesityl group or the like. Aryloxy includes, for example, a phenoxy group, or a 4-methylphenoxy group, or the like). An example of alkylthio is phenylthio or methylthio. Examples of amino alkyl include methyl amino, ethyl amino, or the like. An aryl amino can include an anilino group.

$L_3$ and $L_4$ may be methylene and methine groups corresponding to any of the alkyl groups mentioned above. However, $L_3$ is preferably $CH_2$ while $L_4$ is preferably CH or $CR_7$, where $R_7$ is a lower alkyl group (preferably $CH_3$).

As to the construction of a photographic element of the present invention, the element has at least one light sensitive layer which is preferably a silver halide emulsion layer. While the ultraviolet absorbing polymer of the present invention may be located anywhere in the element, the element additionally preferably has a non-light sensitive layer, with the ultraviolet absorbing polymer being located in the non-light sensitive layer. The non-light sensitive layer containing the ultraviolet absorbing polymer is preferably located above all light sensitive layers. The ultraviolet absorbing polymer is preferably in the form of a latex in the element.

Examples of monomers IM-1 through IM-14 which, when polymerized across the ethylenically unsaturated bond shown yield polymers of the present invention, are shown below.

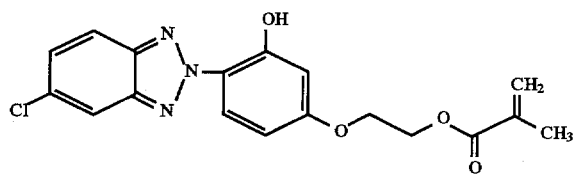

IM-1

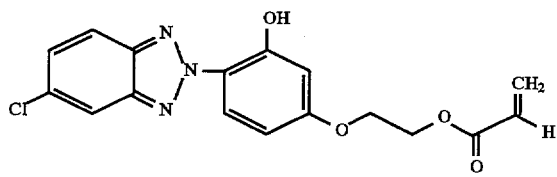

IM-2

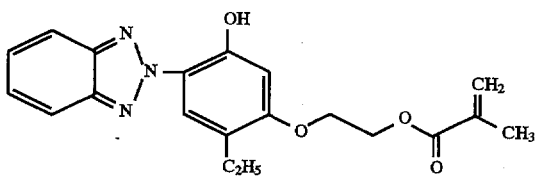

IM-3

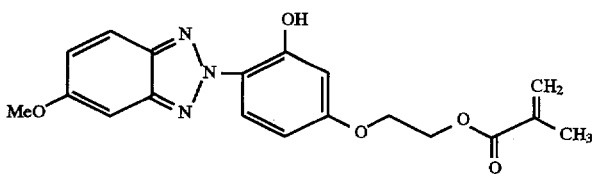

IM-4

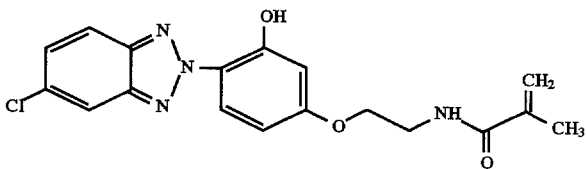

IM-5

-continued
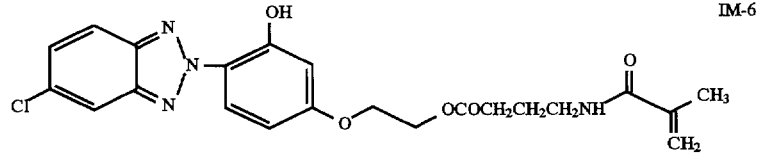
IM-6
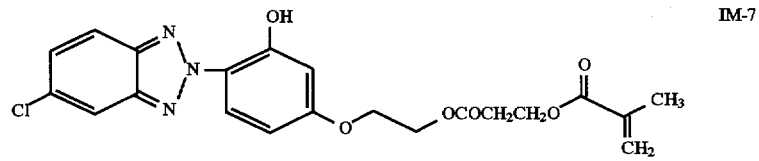
IM-7
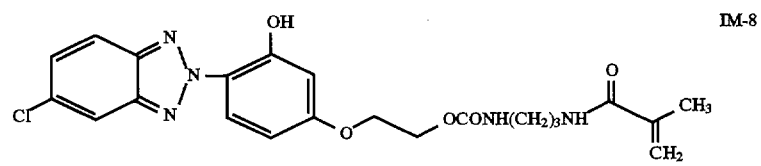
IM-8
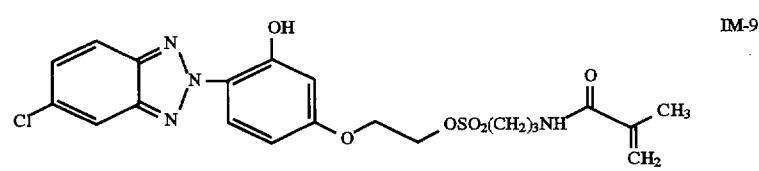
IM-9
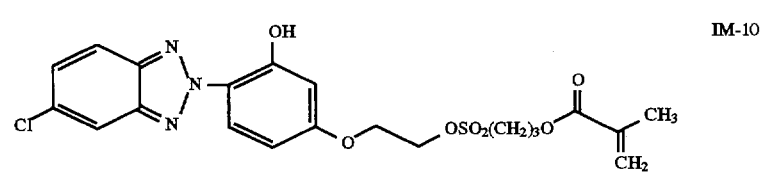
IM-10
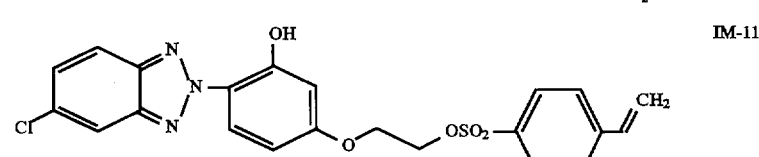
IM-11
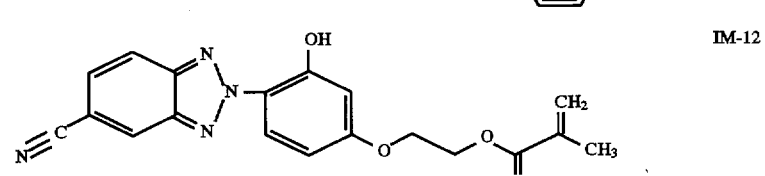
IM-12
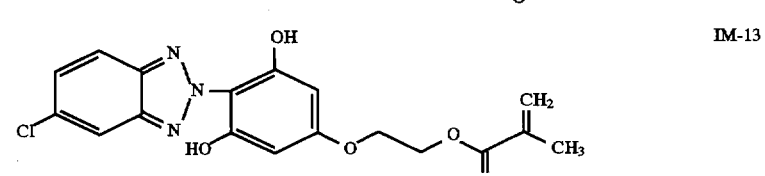
IM-13
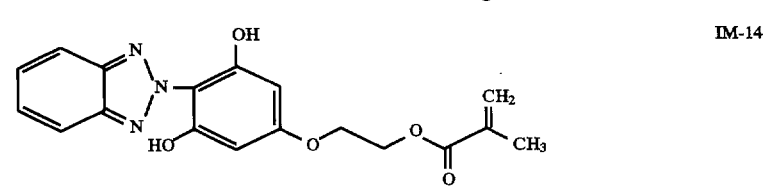
IM-14

Comparative monomers, which are used in some of the examples below, are as follows:

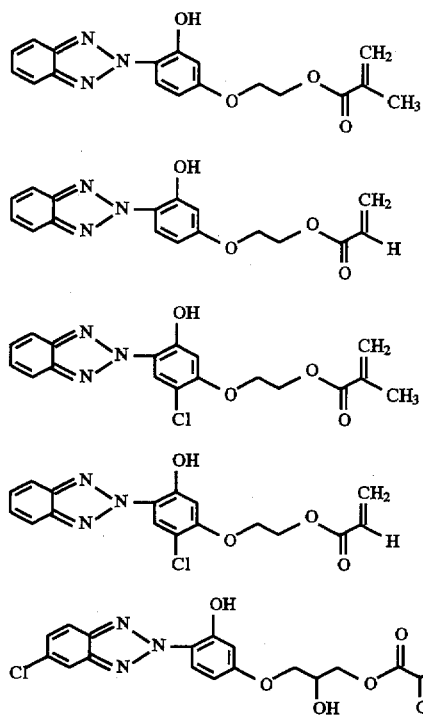

CM-1
CM-2
CM-3
CM-4
CM-5

Monomers of the type such as IM-1 through IM-14, which when polymerized, provide polymers of the present invention, can be prepared from the corresponding 2-(2',4'-dihydroxyphenyl)benzotriazole intermediate (V) by methods such as described in U.S. Pat. No. 5,372,922 and EP 0 190 003. A preferred method for the synthesis of (V) is described in U.S. Pat. No. 5,455,152 by Vishwakarma entitled BENZOTRIAZOLE BASED UV ABSROBING MONOMERS AND PHOTOGRPAHIC ELEMENTS CONTAINING POLYMERS FORMED FROM THEM, which is incorporated herein by reference. That preferred method is generally shown in Scheme 1 below:

Scheme 1

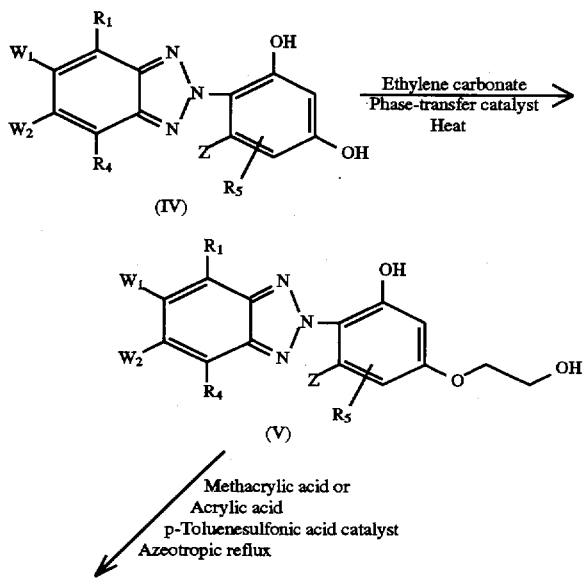

(IV)

(V)

Methacrylic acid or
Acrylic acid
p-Toluenesulfonic acid catalyst
Azeotropic reflux -continued
Scheme 1

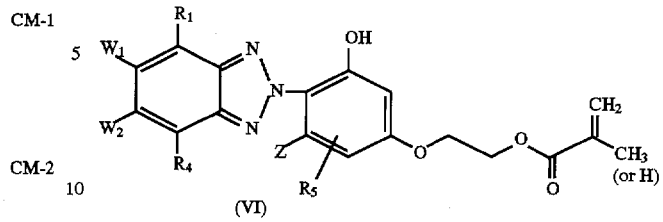

(VI)

The phase-transfer catalyst is preferably a quaternary ammonium or phosphonium salt.

The preparation of 2-(2',4'-dihydroxyphenyl) benzotriazole intermediates (IV) is well known and previously described in, for example, U.S. Pat. No. 3,072,585; European patent application number 86300416 (1986); and U.S. Pat. No. 4,028,331. The intermediate compounds with Z=OH falling under the general formula (IV) could be synthesized by known method (See for example, Y. Jiang et al. *Polymer Bulletin* (Berlin), V. 20(2), p. 169–176 (1988) and *Chemical Abstracts* V. 109, Number 191389). Details of preparations are illustrated in the specific synthesis below (synthesis of monomers for comparative polymers are provided since these syntheses are analogous to those of monomers for inventive polymers).

The ultraviolet absorbing polymer in the photographic elements of the present invention will have the general formula:

$$(A)_x(B)_y$$

In the above, A is a unit formed from a UV absorbing monomer of a type of the present invention (such as formula (I)). B is any comonomer (including the possibility that B is another unit formed from a monomer of the type of formula (II) but is different from (A)). x and y are the molar ratio of UV monomer and a comonomer and can be any numbers. The ratios of x:y can, for example, be between 10:1 to 1:10. However, particularly when B is a comonomer which is not of formula (I) (and more particularly when B is not any UV absorbing monomeric unit) preferably the ratio of y to x is no more than 20:1 (and preferably no more than 10:1 and more preferably no more than 4:1). y may particularly be 0 (in which case the polymer is a homopolymer consisting only of monomeric units formed from the same monomers of formula (II)) but x cannot be 0. When y is not 0, the UV absorbing polymer is a copolymer.

B is a unit formed from any ethylenically unsaturated comonomers, including an acrylic acid, an α-alkylacrylacid (such as methacrylic acid, etc.), an ester or amide derived from an acrylic acid or methacrylic acid(for example, acrylamide, methacrylamide, n-butylacrylamide, t-butylacrylamide, diacetone acrylamide, methyl acrylate, ethyl acrylate, n-propylacrylate, n-butyl acrylate, t-butyl acrylate, isobutyl acrylate, 2-ethylhexyl acrylate, n-octyl acrylate, lauryl acrylate, 2-ethoxyethyl acrylate, 2-methoxyethyl acrylate,methyl methacrylate, ethyl methacrylate, n-butyl methacrylate, β-hydroxyl methacrylate, etc.), a vinyl ester(for example, vinyl acetate, vinyl propionate, vinyl laurate, etc.), acrylonitrile, methacrylonitrile, an aromatic vinyl compound (for example, styrene and a derivative thereof, for example, vinyl toluene, divinylbenzene, vinyl acetophenone, sulfostyrene, etc.), itaconic acid, citraconic acid, crotonic acid, vinylidene chloride, a vinyl alkyl ether(for example, vinyl ethyl ether, etc.), an ester of maleic acid, N-vinyl-2-pyrrolidone, N-vinylpyridine, 2- or 4-vinylpyridine, etc., an sulfonic acid containing monomers, (for example, acrylamido-2,2'-dimethyl-propane sulfonic acid, 2-sulfoethyl methacrylate, 3-sulfopropyl methacrylate, and the like).

Of the monomers from which B is formed, an ester of acrylic acid, an ester of methacrylic acid, and an aromatic vinyl compounds are particularly preferred.

Two or more of the above-described comonomers which form B, can be used together, for example, a combination of butyl acrylate and acrylamido-2,2'-dimethyl propane sulfonic acid.

Two or more of the UV absorbing monomers can be copolymerized together, for example, a combination of CM-1 with IM-1 or with other UV absorbing monomers described in the prior art. Particularly, a copolymer may contain units of the formula:

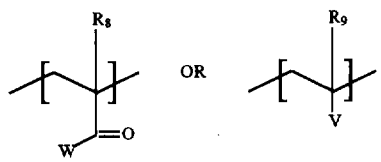

wherein: W is an amino group (such as one with one or two further alkyl group substituents, particularly lower alkyl groups), alkoxy group, or phenoxy group; V is a substituted or unsubstituted phenyl; and $R_8$ and $R_9$ are H or a substituted or unsubstituted 1 to 6 carbon atom alkyl.

An example of a suitable polymer of the present invention is IP-1 below (structures of comparative polymers CP-1 through CP-3 are also provided below). All polymer formulas are based on molar ratios of monomers.

IP-1 (invention)

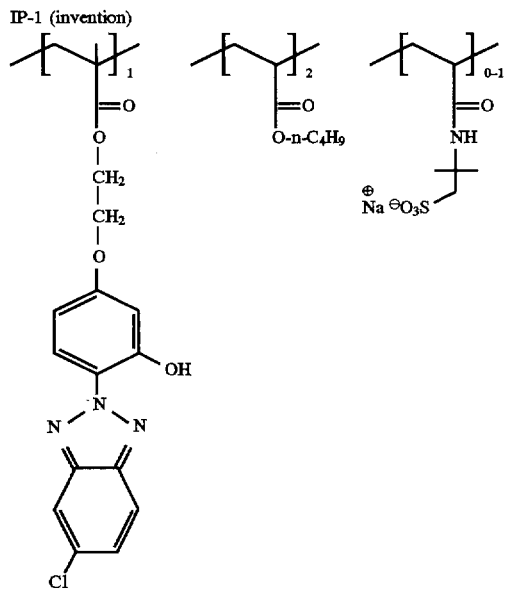

CP-1 (comparative)

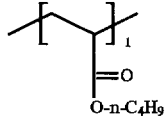

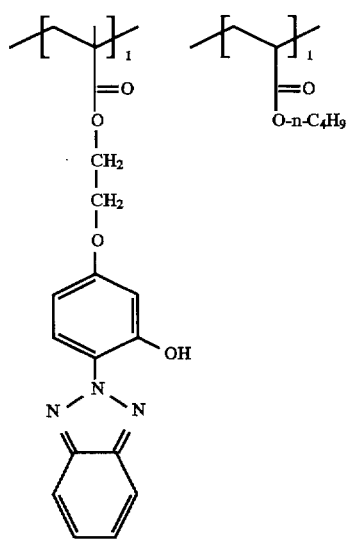

CP-2 (comparative)

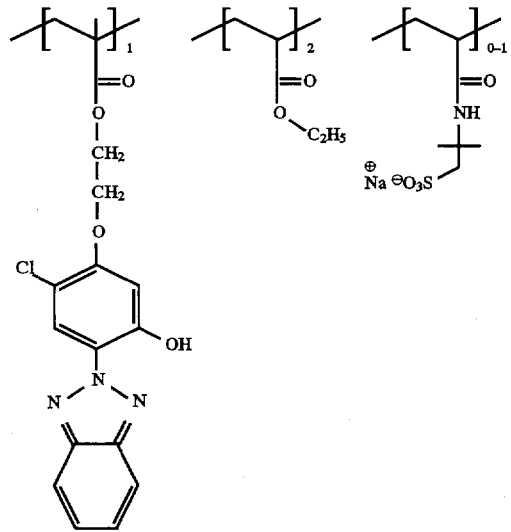

CP-3 (comparative)

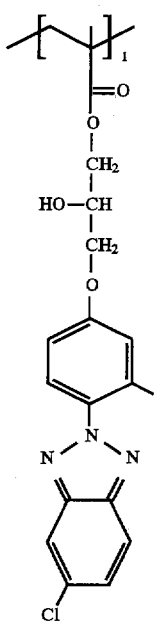
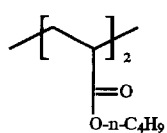
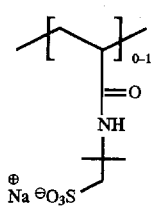

Other examples of UV absorbing polymers of the present invention are listed in Table A below, which polymers contain repeating units formed from UV absorbing monomers of the following structure (M):

TABLE A

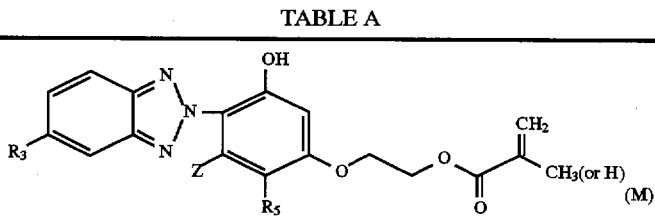

(M)

| Polymer | R₃ | Z | R₅ | Compositions | Molar Ratio |
|---|---|---|---|---|---|
| IP-2 | Cl | H | H | M:Ba:NaAMPS | 1:2:0.1 |
| IP-3 | Cl | H | H | M:Ea:NaAMPS | 1:1:0.1 |
| IP-4 | Cl | H | H | M:Ea:NaAMPS | 1:2:0.1 |
| IP-5 | Cl | H | H | M:EEa:NaAMPS | 1:1:0.1 |
| IP-6 | Cl | H | H | M:EEa:NaAMPS | 1:2:0.1 |
| IP-7 | H | H | Cl | M:Ba:NaAMPS | 1:2:0.1 |
| IP-8 | H | H | Cl | M:Ea:NaAMPS | 1:1:0.1 |
| IP-9 | H | H | Cl | M:Ea:NaAMPS | 1:2:0.1 |
| IP-10 | H | H | Cl | M:EEa:NaAMPS | 1:1:0.1 |
| IP-11 | H | H | Cl | M:EEa:NaAMPS | 1:2:0.1 |
| IP-12 | MeO | H | H | M:Ba:NaAMPS | 1:1:0.1 |
| IP-13 | MeO | H | H | M:Ba:NaAMPS | 1:2:0.1 |
| IP-14 | MeO | H | H | M:Ea:NaAMPS | 1:1:0.1 |
| IP-15 | MeO | H | H | M:Ea:NaAMPS | 1:2:0.1 |
| IP-16 | MeO | H | H | M:EEa:NaAMPS | 1:1:0.1 |
| IP-17 | MeO | H | H | M:EEa:NaAMPS | 1:2:0.1 |
| IP-18 | F | H | H | M:Ba:NaAMPS | 1:1:0.1 |
| IP-19 | F | H | H | M:Ba:NaAMPS | 1:2:0.1 |
| IP-20 | F | H | H | M:Ea:NaAMPS | 1:1:0.1 |
| IP-21 | F | H | H | M:Ea:NaAMPS | 1:2:0.1 |
| IP-22 | F | H | H | M:EEa:NaAMPS | 1:1:0.1 |
| IP-23 | F | H | H | M:EEa:NaAMPS | 1:2:0.1 |
| IP-24 | CN | H | H | M:Ba:NaAMPS | 1:1:0.1 |
| IP-25 | CN | H | H | M:Ba:NaAMPS | 1:2:0.1 |
| IP-26 | CN | H | H | M:Ea:NaAMPS | 1:1:0.1 |
| IP-27 | CN | H | H | M:Ea:NaAMPS | 1:2:0.1 |
| IP-28 | CN | H | H | M:EEa NaAMPS | 1:1:0.1 |
| IP-29 | CN | H | H | M:EEa:NaAMPS | 1:2:0.1 |
| IP-30 | H | H | Et | M:Ba:NaAMPS | 1:1:0.1 |
| IP-31 | H | H | Et | M:Ba:NaAMPS | 1:2:0.1 |
| IP-32 | H | H | Et | M:Ea:NaAMPS | 1:1:0.1 |
| IP-33 | H | H | Et | M:Ea:NaAMPS | 1:2:0.1 |
| IP-34 | H | H | Et | M:EEa:NaAMPS | 1:1:0.1 |

TABLE A-continued $$\text{[Structure: benzotriazole with } R_3\text{, OH, Z, } R_5\text{, and } -O-CH_2-CH_2-O-C(=O)-C(CH_3\text{ or H})=CH_2 \text{ group] (M)}$$

| Polymer | $R_3$ | Z  | $R_5$ | Compositions  | Molar Ratio |
|---------|-------|----|----|----|----|
| IP-35   | H     | H  | Et | M:EEa:NaAMPS  | 1:2:0.1 |
| IP-36   | F     | OH | H  | M:Ba:NaAMPS   | 1:1:0.1 |
| IP-37   | F     | OH | H  | M:Ba:NaAMPS   | 1:2:0.1 |
| IP-38   | F     | OH | H  | M:Ea:NaAMPS   | 1:1:0.1 |
| IP-39   | F     | OH | H  | M:Ea:NaAMPS   | 1:2:0.1 |
| IP-40   | F     | OH | H  | M:EEa:NaAMPS  | 1:1:0.1 |
| IP-41   | F     | OH | H  | M:EEa:NaAMPS  | 1:2:0.1 |
| IP-42   | H     | OH | H  | M:Ba:NaAMPS   | 1:1:0.1 |
| IP-43   | H     | OH | H  | M:Ba:NaAMPS   | 1:2:0.1 |
| IP-44   | H     | OH | H  | M:Ea:NaAMPS   | 1:1:0.1 |
| IP-45   | H     | OH | H  | M:Ea:NaAMPS   | 1:2:0.1 |
| IP-46   | H     | OH | H  | M:EEa:NaAMPS  | 1:1:0.1 |
| IP-47   | H     | OH | H  | M:EEa:NaAMPS  | 1:2:0.1 |
| IP-48   | Cl    | OH | H  | M:Ba:NaAMPS   | 1:1:0.1 |
| IP-49   | Cl    | OH | H  | M:Ba:NaAMPS   | 1:2:0.1 |
| IP-50   | Cl    | OH | H  | M:Ea:NaAMPS   | 1:1:0.1 |
| IP-51   | Cl    | OH | H  | M:Ea:NaAMPS   | 1:2:0.1 |
| IP-52   | Cl    | OH | H  | M:EEa:NaAMPS  | 1:1:0.1 |
| IP-53   | Cl    | OH | H  | M:EEa:NaAMPS  | 1:2:0.1 | where, M is a UV absorbing monomer; Ba = Butyl acrylate; Ea = Ethyl acrylate; EEa = 2-Ethoxyethyl acrylate; NaAMPS = Sodium acrylamido-2-methyl-1-propane sulfonic acid.

All of the above formulas are based on molar ratios of monomers.

Latexes of the ultraviolet absorbing polymers of the present invention are preferably prepared by emulsion polymerization and photographic elements can be prepared using such latexes. Methods of forming the required latex include emulsion polymerization. Emulsion polymerization is well known in the art and is described, for example, in F. A. Bovey, *Emulsion Polymerization*, issued by Interscience Publishers Inc. New York, 1955. Examples of the chemical initiators which may be used include a thermally decomposable initiator, for example, a persulfate (such as ammonium persulfate, potassium persulfate, etc), hydrogen peroxide, 4,4'-azobis (4-cyanovaleric acid), and redox initiators such as hydrogen peroxide-iron(II) salt, potassium persulfate-sodium hydrogensulfate, cerium salt-alcohol, etc. Emulsifiers which may be used in the emulsion polymerization include soap, a sulfonate(for example, sodium N-methyl-N-oleoyltaurate, etc.), a sulfate( for example, sodium dodecyl sulfate, etc.), a cationic compound(for example, hexadecyl trimethylammonium bromide, etc.), an amphoteric compound and a high molecular weight protective colloid(for example, polyvinyl alcohol, polyacrylic acid, gelatin, etc.). Specific examples and functions of the emulsifiers are described in *Belgische Chemische Industrie*, Vol.28, pages 16–20(1963).

Emulsion polymerization of solid water-insoluble UV absorbing monomer is usually carried out in an aqueous system or a water/organic solvent system. Organic solvents which can be used are preferably those which have high water miscibility, are substantially inert to the monomers to be used, and do not interrupt usual reactions in free radical addition polymerization. Preferred examples include a lower alcohol having from 1 to 4 carbon atoms (for example, methanol, ethanol, isopropanol, etc.), a ketone(for example, acetone, etc.), a cyclic ether (for example, tetrahydrofuran, etc.), a nitrile (for example, acetonitrile,etc.), an amide (for example, N,N-dimethylforamide, etc.), a sulfoxide (for example, dimethylsulfoxide), and the like. This method is the most direct way of preparing a polymer latex as described in U.S. Pat. Nos. 4,464,462; 4,455,368 and European Patent publication 0 190 003 (1991).

High boiling organic solvents (so-called coupler solvent) can also be added to modify the physical properties of the photographic materials The loading of high boiling organic solvents into polymer latex was described in the following publications: U.S. Pat. No. 4,199,363, U.S. Pat. No. 4,203,716, U.S. Pat. No. 4,214,047, U.S. Pat. No. 4,247,627, U.S. Pat. No. 4,497,929, and U.S. Pat. No. 4,608,424.

As to the method of loading the high boiling point organic solvent in the polymer latex, "loading" a polymer latex is generally described in U.S. Pat. No. 4,199,363 for example. There are several methods of loading the high boiling point solvents into the polymer latex. First, an aqueous dispersion of a high boiling point solvent (or mixture of such solvents) is prepared by the conventional colloid mill process in the presence of gelatin. This dispersion is then blended with the polymer latex such that the weight ratio of high boiling, water immiscible organic solvent to polymer latex is between 0.1 to 5.0 (that is, 0.1/1 to 5.0/1 of solvent/polymer latex), and more preferably between 0.2 to 3.0 (that is, 0.2/1 to 3.0/1 of solvent/polymer latex).

In a second method of loading the polymer latex, the high boiling point solvent is loaded into the polymeric UV absorbing agent in the presence of low boiling organic solvents, such as methanol or acetone. The auxiliary solvent is then evaporated with a rotary evaporator. The same weight ratios of high boiling, water immiscible organic solvent can be used as in the above method.

Loading of a polymer latex is also described, for example, in U.S. Pat. No. 4,203,716, U.S. Pat. No. 4,214,047, U.S. Pat. No. 4,247,627, U.S. Pat. No. 4,497,929 and U.S. Pat. No. 4,608,424.

Conventional (that is, monomeric) UV absorbers can also be loaded into the UV absorbing polymer latexes of the photographic elements of the present invention to alter their photographic performance. Examples of such conventional UV absorbing agents which can be used include: 2-(2-hydroxy-5-methylphenyl)-2H-benzotriazole, 2-(2-hydroxy-3,5-di-tert-butylphenyl)-2H-benzotriazole, 2-(2-hydroxy-3-tert-butyl-5-methylphenyl)-2H-benzotriazole, 2-(2-hydroxy-3,5-di-tert-butylphenyl)-5-chloro-2H-benzotriazole, 2-(2-hydroxy-3,5-di-tert-amylphenyl)-2H-benzotriazole, 2-(2-hydroxy-3,5-di(1,1-dimethylbenzyl)-phenyl)-2H-benzotriazole, 2-(2-hydroxy-5-tert-octylphenyl)-2H-benzotriazole. Other types of UV absorbing agents include p-hydroxybenzoates, phenylesters of benzoic acid, salicylanilides and oxanilides, diketones, benzylidene malonate, esters of α-cyano-β-phenylcinnamic acid, and organic metal photostabilizers, and others, as described in J. F. Rabek, *Photostabilization of Polymers, Principles and Applications*, Elsevier Science Publishers LTD, England, page 202–278(1990).

A dispersion of a polymer of the present invention is incorporated into the photographic element (typically into a gelatin gel thereof) in an amount of between 0.2 g/m$^2$ to 10 g/m$^2$, and more preferably between 0.5 g/m$^2$ to 5.0 g/m$^2$. Furthermore, the weight ratio of high boiling, water immiscible organic solvent, when present, to polymer latex is preferably between 0.1 to 5.0 (that is, 0.1/1 to 5.0/1 of solvent/polymer latex), and more preferably between 0.2 to 3.0 (that is, 0.2/1 to 3.0/1 of solvent/polymer latex).

The polymer of the present invention is provided in any one or more of the layers (for example, a hydrophilic colloid layer) of a photographic light-sensitive material (preferably a silver halide photographic light-sensitive material), such as a surface protective layer, an intermediate layer or a silver halide emulsion layer, and the like. For example, in photographic paper the UV absorbing polymer latex may be positioned above and/or below the red sensitive layer (preferably above and adjacent to it), the red sensitive layer typically being the uppermost light sensitive layer in color paper, or even completely or partially within the red sensitive layer.

The photographic elements made by the method of the present invention can be single color elements or multicolor elements. Multicolor elements contain dye image-forming units sensitive to each of the three primary regions of the spectrum. Each unit can be comprised of a single emulsion layer or of multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like. All of these can be coated on a support which can be transparent or reflective (for example, a paper support).

Photographic elements of the present invention may also usefully include a magnetic recording material as described in *Research Disclosure*, Item 34390, November 1992, or a transparent magnetic recording layer such as a layer containing magnetic particles on the underside of a transparent support as in U.S. Pat. No. 4,279,945 and U.S. Pat. No. 4,302,523. The element typically will have a total thickness (excluding the support) of from 5 to 30 microns. While the order of the color sensitive layers can be varied, they will normally be red-sensitive, green-sensitive and blue-sensitive, in that order on a transparent support, (that is, blue sensitive furthest from the support) and the reverse order on a reflective support being typical.

The present invention also contemplates the use of photographic elements of the present invention in what are often referred to as single use cameras (or "film with lens" units). These cameras are sold with film preloaded in them and the entire camera is returned to a processor with the exposed film remaining inside the camera. Such cameras may have glass or plastic lenses through which the photographic element is exposed.

In the following discussion of suitable materials for use in elements of this invention, reference will be made to *Research Disclosure*, September 1994, Number 365, Item 36544, which will be identified hereafter by the term "Research Disclosure I." The Sections hereafter referred to are Sections of the Research Disclosure I unless otherwise indicated. All Research Disclosures referenced are published by Kenneth Mason Publications, Ltd., Dudley Annex, 12a North Street, Emsworth, Hampshire P010 7DQ, ENGLAND. The foregoing references and all other references cited in this application, are incorporated herein by reference.

The silver halide emulsions employed in the photographic elements of the present invention may be negative-working, such as surface-sensitive emulsions or unfogged internal latent image forming emulsions, or positive working emulsions of internal latent image forming emulsions (that are either fogged in the element or fogged during processing). Suitable emulsions and their preparation as well as methods of chemical and spectral sensitization are described in Sections I through V. Color materials and development modifiers are described in Sections V through XX. Vehicles which can be used in the photographic elements are described in Section II, and various additives such as brighteners, antifoggants, stabilizers, light absorbing and scattering materials, hardeners, coating aids, plasticizers, lubricants and matting agents are described, for example, in Sections VI through XIII. Manufacturing methods are described in all of the sections, layer arrangements particularly in in Section XI, exposure alternatives in Section XVI, and processing methods and agents in Sections XIX and XX.

With negative working silver halide a negative image can be formed. Optionally a positive (or reversal) image can be formed although a negative image is typically first formed.

The photographic elements of the present invention may also use colored couplers (e.g. to adjust levels of interlayer correction) and masking couplers such as those described in EP 213 490; Japanese Published Application 58-172,647; U.S. Pat. No. 2,983,608; German Application DE 2,706,117C; U.K. Patent 1,530,272; Japanese Application A-113935; U.S. Pat. No. 4,070,191 and German Application DE 2,643,965. The masking couplers may be shifted or blocked.

The photographic elements may also contain materials that accelerate or otherwise modify the processing steps of bleaching or fixing to improve the quality of the image. Bleach accelerators described in EP 193 389; EP 301 477; U.S. Pat. No. 4,163,669; U.S. Pat. No. 4,865,956; and U.S. Pat. No. 4,923,784 are particularly useful. Also contemplated is the use of nucleating agents, development accelerators or their precursors (UK Patent 2,097,140; U.K. Patent 2,131,188); electron transfer agents (U.S. Pat. No. 4,859,578; U.S. Pat. No. 4,912,025); antifogging and anti color-mixing agents such as derivatives of hydroquinones, aminophenols, amines, gallic acid; catechol; ascorbic acid; hydrazides; sulfonamidophenols; and non color-forming couplers.

The elements may also contain filter dye layers comprising colloidal silver sol or yellow and/or magenta filter dyes and/or antihalation dyes (particularly in an undercoat beneath all light sensitive layers or in the side of the support opposite that on which all light sensitive layers are located) either as oil-in-water dispersions, latex dispersions or as solid particle dispersions. Additionally, they may be used with "smearing" couplers (e.g. as described in U.S. Pat. No. 4,366,237; EP 096 570; U.S. Pat. No. 4,420,556; and U.S. Pat. No. 4,543,323.) Also, the couplers may be blocked or coated in protected form as described, for example, in Japanese Application 61/258,249 or U.S. Pat. No. 5,019, 492.

The photographic elements may further contain other image-modifying compounds such as "Developer Inhibitor-Releasing" compounds (DIR's). Useful additional DIR's for elements of the present invention, are known in the art and examples are described in U.S. Pat. Nos. 3,137,578; 3,148,022; 3,148,062; 3,227,554; 3,384,657; 3,379,529; 3,615,506; 3,617,291; 3,620,746; 3,701,783; 3,733,201; 4,049,455; 4,095,984; 4,126,459; 4,149,886; 4,150,228; 4,211,562; 4,248,962; 4,259,437; 4,362,878; 4,409,323; 4,477,563; 4,782,012; 4,962,018; 4,500,634; 4,579,816; 4,607,004; 4,618,571; 4,678,739; 4,746,600; 4,746,601; 4,791,049; 4,857,447; 4,865,959; 4,880,342; 4,886,736; 4,937,179; 4,946,767; 4,948,716; 4,952,485; 4,956,269; 4,959,299; 4,966,835; 4,985,336 as well as in patent publications GB 1,560,240; GB 2,007,662; GB 2,032,914; GB 2,099,167; DE 2,842,063, DE 2,937,127; DE 3,636,824; DE 3,644,416 as well as the following European Patent Publications: 272,573; 335,319; 336,411; 346, 899; 362,870; 365,252; 365,346; 373,382; 376,212; 377,463; 378,236; 384,670; 396,486; 401,612; 401,613.

DIR compounds are also disclosed in "Developer-Inhibitor-Releasing (DIR) Couplers for Color Photography," C. R. Barr, J. R. Thirtle and P. W. Vittum in *Photographic Science and Engineering*, Vol. 13, p. 174 (1969), incorporated herein by reference.

It is also contemplated that the concepts of the present invention may be employed to obtain reflection color prints as described in *Research Disclosure*, November 1979, Item 18716, available from Kenneth Mason Publications, Ltd, Dudley Annex, 12a North Street, Emsworth, Hampshire P0101 7DQ, England, incorporated herein by reference. The emulsions and materials to form elements of the present invention, may be coated on pH adjusted support as described in U.S. Pat. No. 4,917,994; with epoxy solvents (EP 0 164 961); with additional stabilizers (as described, for example, in U.S. Pat No. 4,346,165; U.S. Pat. No. 4,540,653 and U.S. Pat. No. 4,906,559); with ballasted chelating agents such as those in U.S. Pat. No. 4,994,359 to reduce sensitivity to polyvalent cations such as calcium; and with stain reducing compounds such as described in U.S. Pat. No. 5,068,171 and U.S. Pat. No. 5,096,805. Other compounds useful in the elements of the invention are disclosed in Japanese Published Applications 83-09,959; 83-62,586; 90-072,629; 90-072,630; 90-072,632; 90-072,633; 90-072,634; 90-077, 822; 90-078,229; 90-078,230; 90-079,336; 90-079,338; 90-079,690; 90- 079,691; 90-080,487; 90-080,489; 90-080, 490; 90-080,491; 90-080,492; 90-080,494; 90-085,928; 90-086,669; 90-086,670; 90-087,361; 90-087,362; 90-087, 363; 90-087,364; 90-088,096; 90-088,097; 90-093,662; 90-093,663; 90-093,664; 90-093,665; 90-093,666; 90-093, 668; 90-094,055; 90-094,056; 90-101,937; 90-103,409; 90-151,577.

The silver halide used in the photographic elements may be silver iodobromide, silver bromide, silver chloride, silver chlorobromide, silver chloroiodobromide, and the like. For example, the silver halide used in the photographic elements of the present invention may contain at least 90% silver chloride or more (for example, at least 95%, 98%, 99% or 100% silver chloride). In the case of such high chloride silver halide emulsions, some silver bromide may be present but typically substantially no silver iodide. Substantially no silver iodide means the iodide concentration would be no more than 1%, and preferably less than 0.5 or 0.1%. In particular, in such a case the possibility is also contemplated that the silver chloride could be treated with a bromide source to increase its sensitivity, although the bulk concentration of bromide in the resulting emulsion will typically be no more than about 2 to 2.5% and preferably between about 0.6 to 1.2% (the remainder being silver chloride). The foregoing % figures are mole %.

The type of silver halide grains preferably include polymorphic, cubic, and octahedral. The grain size of the silver halide may have any distribution known to be useful in photographic compositions, and may be either polydispersed or monodispersed.

Tabular grain silver halide emulsions may also be used. Tabular grains are those with two parallel major faces each clearly larger than any remaining grain face and tabular grain emulsions are those in which the tabular grains account for at least 30 percent, more typically at least 50 percent, preferably >70 percent and optimally >90 percent of total grain projected area. The tabular grains can account for substantially all (>97 percent) of total grain projected area. The tabular grain emulsions can be high aspect ratio tabular grain emulsions—i.e., ECD/t>8, where ECD is the diameter of a circle having an area equal to grain projected area and t is tabular grain thickness; intermediate aspect ratio tabular grain emulsions—i.e., ECD/t=5 to 8; or low aspect ratio tabular grain emulsions—i.e., ECD/t=2 to 5. The emulsions typically exhibit high tabularity (T), where T (i.e., $ECD/t^2$) >25 and ECD and t are both measured in micrometers (µm). The tabular grains can be of any thickness compatible with achieving an aim average aspect ratio and/or average tabularity of the tabular grain emulsion. Preferably the tabular grains satisfying projected area requirements are those having thicknesses of <0.3 µm, thin (<0.2 µm) tabular grains being specifically preferred and ultrathin (<0.07 µm) tabular grains being contemplated for maximum tabular grain performance enhancements. When the native blue absorption of iodohalide tabular grains is relied upon for blue speed, thicker tabular grains, typically up to 0.5 µm in thickness, are contemplated.

High iodide tabular grain emulsions are illustrated by House U.S. Pat. No. 4,490,458, Maskasky U.S. Pat. No. 4,459,353 and Yagi et al EPO 0 410 410.

Tabular grains formed of silver halide(s) that form a face centered cubic (rock salt type) crystal lattice structure can have either {100} or {111} major faces. Emulsions containing {111} major face tabular grains, including those with controlled grain dispersities, halide distributions, twin plane spacing, edge structures and grain dislocations as well as adsorbed {111} grain face stabilizers, are illustrated in those references cited in *Research Disclosure I*, Section I.B.(3) (page 503).

The silver halide grains to be used in the invention may be prepared according to methods known in the art, such as those described in *Research Disclosure I* and James, *The Theory of the Photographic Process*. These include methods such as ammoniacal emulsion making, neutral or acidic emulsion making, and others known in the art. These methods generally involve mixing a water soluble silver salt with a water soluble halide salt in the presence of a protective colloid, and controlling the temperature, pAg, pH values, etc. at suitable values during formation of the silver halide by precipitation.

The silver halide to be used in the invention may be advantageously subjected to chemical sensitization with noble metal (for example, gold) sensitizers, middle chalcogen (for example, sulfur) sensitizers, reduction sensitizers and others known in the art. Compounds and techniques useful for chemical sensitization of silver halide are known in the art and described in *Research Disclosure I* and the references cited therein.

The photographic elements of the present invention, as is typical, provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide. copolymers, and the like, as described in *Research Disclosure I*. The vehicle can be present in the emulsion in any amount useful in photographic emulsions. The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30 to 80° C., as described in *Research Disclosure I*, Section IV (pages 510–511) and the references cited therein.

The silver halide may be sensitized by sensitizing dyes by any method known in the art, such as described in *Research Disclosure I*. The dye may be added to an emulsion of the silver halide grains and a hydrophilic colloid at any time prior to (e.g., during or after chemical sensitization) or simultaneous with the coating of the emulsion on a photographic element. The dyes may, for example, be added as a solution in water or an alocohol. The dye/silver halide emulsion may be mixed with a dispersion of color image-forming coupler immediately before coating or in advance of coating (for example, 2 hours).

Photographic elements of the present invention are preferably imagewise exposed using any of the known techniques, including those described in *Research Disclosure I*, section XVI. This typically involves exposure to light in the visible region of the spectrum, and typically such exposure is of a live image through a lens, although exposure can also be exposure to a stored image (such as a computer stored image) by means of light emitting devices (such as light emitting diodes, CRT and the like).

Photographic elements comprising the composition of the invention can be processed in any of a number of well-known photographic processes utilizing any of a number of well-known processing compositions, described, for example, in *Research Disclosure I*, or in T. H. James, editor, *The Theory of the Photographic Process*, 4th Edition, Macmillan, New York, 1977. In the case of processing a negative working element, the element is treated with a color developer (that is one which will form the colored image dyes with the color couplers), and then with a oxidizer and a solvent to remove silver and silver halide. In the case of processing a reversal color element, the element is first treated with a black and white developer (that is, a developer which does not form colored dyes with the coupler compounds) followed by a treatment to fog silver halide (usually chemical fogging or light fogging), followed by treatment with a color developer. Preferred color developing agents are p-phenylenediamines. Especially preferred are:

4-amino N,N-diethylaniline hydrochloride, 4-amino-3-methyl-N,N-diethylaniline hydrochloride, 4-amino-3-methyl-N-ethyl-N-(β-(methanesulfonamido) ethylaniline sesquisulfate hydrate, 4-amino-3-methyl-N-ethyl-N-(β-hydroxyethyl)aniline sulfate, 4-amino-3-β-(methanesulfonamido)ethyl-N,N-diethylaniline hydrochloride and 4-amino-N-ethyl-N-(2-methoxyethyl)-m-toluidine di-p-toluene sulfonic acid.

Development is followed by bleach-fixing, to remove silver or silver halide, washing and drying.

The present invention will be further described in the examples below.

The UV monomers CM-1, CM-3 and IM-1 were made from the corresponding 2-(2'-hydroxy-4'-hydroxyethoxyphenyl) benzotriazole precursor of formula (V) in Scheme 1 above, by reacting them with methacrylic acid or acrylic acid under azeotropic reflux in the presence of p-toluene sulfonic acid as a catalyst and an inhibitor such as hydroquinone in toluene. The following synthetic examples illustrate this general procedure.

Synthesis of UV monomer CM-1

In a 1-L 3-necked round-bottom flask, a mixture of 2-(2'-hydroxy-4'-hydroxyethoxyphenyl)benzotriazole (30.49 g, 0.1125 mole), methacrylic acid (11.4 g, 0.133 mole), p-toluenesulfonic acid (1.5 g, 0.008 mole, 7% equivalent), 0.02 g of hydroquinone, and 450 mL of toluene was refluxed azeotropically on a heating mantle until no more water distilled off (about 16 hours). It was cooled down to room temperature, transferred to a 2-L separatory funnel, washed with 5% aqueous sodium bicarbonate solution until no more effervescence was observed. After drying over anhydrous sodium sulfate (20 g), solvent was completely removed on a rotary evaporator. Dry brown colored solid (37.4 g) was obtained, which was purified by silica gel flash column chromatography eluting with an 4/1 mixture of heptane/methylene chloride. The pure monomer, 23.6 g, was obtained as a white solid after removal of solvents. Its UV-VIS in methanol had an absorption $\lambda_{max}$ at 337 nm with molar extinction coefficient of 23,000. Its elemental analysis for $C_{18}H_{17}N_3O_4$ showed Calculated C, 63.71; H, 5.05; N, 12.38. Found: C, 63.18; H, 4.90; N, 12.23.

Synthesis of UV monomer IM-1

In a 1-L 3-necked round-bottom flask, a mixture of 5-chloro-2-(2'-hydroxy-4'-hydroxyethoxyphenyl) benzotriazole (9.66 g, 0.032 mole), methacrylic acid (8.0 g, 0.094 mole, about 3 mole equivalent), p-toluenesulfonic acid (1.5 g, 0.008 mole, 7% equivalent), 0.05 g of hydroquinone, and 600 mL of toluene was refluxed azeotropically on a heating mantle until no more water distilled off (about 24 hours). It was cooled down to room temperature, transferred to a 2-L separatory funnel, washed with 5% aqueous sodium bicarbonate solution until no more effervescence was observed. After drying over anhydrous sodium sulfate (20 g), solvent was completely removed on a rotary evaporator. Dry brown colored solid was obtained, which was purified by silica gel flash column chromatography eluting with methylene chloride. The pure monomer, 8 g, was obtained as a white solid after removal of solvents. Its UV-VIS in methanol had an absorption $\lambda_{max}$ at 342 nm with molar extinction coefficient of 21,700. Its elemental analysis for $C_{18}H_{16}Cl_1N_3O_4$ showed calculated C, 57.84; H, 4.31; N, 11.24. Found: C, 57.72; H, 4.44; N, 11.22.

Synthesis of UV monomer CM-3

In a 1-L 3-necked round-bottom flask, a mixture of 2-(2'-hydroxy-4'-hydroxyethoxy-5'-chlorophenyl) benzotriazole (18.97 g, 0.062 mole), methacrylic acid (16.0 g, 0.18 mole, about 3 mole equivalent), p-toluenesulfonic acid (1.5 g, 0.008 mole, 7% equivalent), 0.05 g of hydroquinone, and 600 mL of toluene was refluxed azeotropically on a heating mantle until no more water distilled off (about 24 hours). It was cooled down to room temperature, transferred to a 2-L separatory funnel, washed with 5% aqueous sodium bicarbonate solution until no more effervescence was observed. After drying over anhydrous sodium sulfate (20 g), solvent was completely removed on a rotary evaporator. Dry brown colored solid was obtained, which was purified by silica gel flash column chromatography eluting with methylene chloride. The pure monomer was obtained as a white solid after removal of solvents. Its UV-VIS in methanol had an absorption $\lambda_{max}$ at 345 nm with molar extinction coefficient of 24,600. Its elemental analysis for $C_{18}H_{16}Cl_1N_3O_4$ showed calculated. C, 57.84; H, 4.31; N, 11.24. Found: C, 57.66; H, 4.48; N, 11.30.

The following examples illustrate a general preparative procedure for all the UV absorbing polymers used in the elements of the present invention. The comparative polymer CP-3 was also made analogously from the monomer CM-5. The comparative compositions of this invention are identified as C-1 and CP-1 through CP-3. The composition C-1 is conventional dispersion of Compounds (III-A, Tinuvin 328) and (III-B, Tinuvin 326) whereas the comparative examples CP-1 through CP-3 are latexes of copolymers which were made from UV monomers CM-1, CM-3, and CM-5 respectively following the general representative procedure described for CP-1.

Synthesis of Comparative Polymer CP-1

100 g of deionized water, 1.17g of sodium N-methyl-N-oleoyltaurate (Igepon T-33), and 10 mL of acetone were mixed in a 0.5 L 4-neck round bottom flask equipped with a mechanical stirrer, nitrogen inlet, and condenser. The flask was immersed in a constant temperature bath at 80° C. and heated for 30 mins with nitrogen purging through. 0.093 g of potassium persulfate was added. 5 mins later, monomer solution comprising 3.394 g of UV monomer CM-1, 1.28 g of butyl acrylate, 50 mL of N,N-dimethylformamide and 10 mL acetone was fed into reactor over four hours. The polymerization was continued for overnight. The latex was cooled, filtered, dialyzed, and concentrated to 5.47% solid with Amicon's Ultrafiltration unit. The Z-average particle size measured by Malvern's Autosizer IIC was 50 nm. The elemental analysis confirmed the composition.

Synthesis of Comparative Polymer CP-2

Monomer solution comprising 5.61 g of CM-3, 1.5 g of ethylacrylate, 0.34 g of acrylamido-2-methyl-1-propane sulfonic acid, and 80 mL of N,N-dimethylformamide were charged to a 250 mL 3-neck flask. The flask was immersed into a constant temperature bath at 80° C. with nitrogen purging. Nitrogen 0.07 g of azobisisobutylronitrile was added and the polymerization was continued for two hours. After that 0.07 g of azobisisobutylronitrile was further added and polymerized for one more hour. The polymer solution was poured into 60° C. hot water (600 mL) with good agitation. A translucent polymer dispersion was obtained. The latex was cooled, filtered, dialyzed, and concentrated to 4.54% solid with Amicon's Ultrafiltration unit. The Z-average particle size measured by Malvern's Autosizer IIC was 71 nm. The elemental analysis confirmed the composition.

Synthesis of Invention Polymer IP-1

30 g of deionized water, 0.87 g of sodium N-methyl-N-oleoyltaurate (Igepon T-33), and 3 mL of N,N-dimethylformamide were mixed in a 0.5 L 4-neck round bottom flask equipped with a mechanical stirrer, nitrogen inlet, and condenser. The flask was immersed in a constant temperature bath at 80° C. and heated for 30 mins with nitrogen purging through. 1.0 g of 10% sodium persulfate was added. 5 mins later, monomer solution comprising 7.48 g of IM-1, 2.56 g of butyl acrylate, and 80 mL of N,N-dimethylformamide was fed into reactor over four hours. Co-feed solution comprising 0.87 g of Igepon T-33, 1.0 g of 10% sodium persulfate, 0.46 g of sodium acrylamido-2-methyl-1-propane sulfonic acid, 1.05 g of sodium bicarbonate and 240 mL water was pumped into the reactor together concurrently. The polymerization was continued for overnight. The latex was cooled, filtered, dialyzed, and concentrated to 5.47% solid with Amicon's Ultrafiltration unit. The Z-average particle size measured by Malvern's Autosizer IIC was 89 nm. The elemental analysis confirmed the composition.

Comparative C-1

This is a conventional dispersion composed of Tinuvin 328 (0.85), Tinuvin 326 (0.15) (from Ciba-Geigy), 1,4-cyclohexylenedimethylene bis(2-ethylhexanoate) (0.33), 2,5-bis(1,1,3,3-tetramethylbutyl)-1,4-benzenediol (0.114), 10% Alkanol LC (0.555), and TCG2 Gel (0.708). The numbers inside the parenthesis are the relative weight ratio. The dispersion was preparedly the colloid mill process in the presence of gelatin as known in the art. Average particle size is 273 nm.

TINUVIN 328

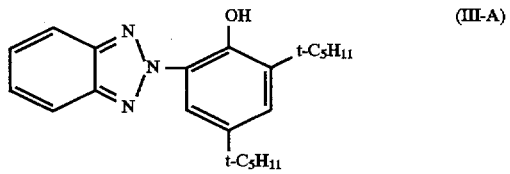
(III-A)

TINUVIN 326

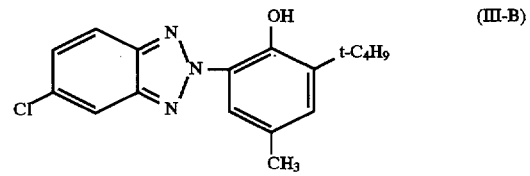
(III-B)

The UV absorbing monomers and comonomers used in the synthesis of polymers are listed in TABLE 1 given below. The structural formula for UV absorbing monomers have already been described.

TABLE 1

| Sample No. | UV Polymer Compositions | Molar Ratio | Remark |
| --- | --- | --- | --- |
| C-1 | III-A & III-B | 85/15 | Comparison* |
| CP-1 | CM-1:Ba | 1:1 | Comparison |
| CP-2 | CM-3:Ea:NaAMPS | 1:2:0.1 | Comparison |
| CP-3 | CM-5:Ba:NaAMPS | 1:2:0.1 | Comparison |
| IP-1 | IM-1:Ba:NaAMPS | 1:1:0.1 | Invention | where, Ba=Butyl acrylate; Ea=Ethyl acrylate; and NaAMPS=sodium acryl amido-2-methyl-1-propane sulfonic acid. * C-1 is not a polymer.

PHOTOGRAPHIC EXAMPLES

Example 1

The intrinsic light stability of UV absorbing agents themselves is very important for the protection of photographic materials from dye fade. The light stability of the polymeric UV absorbing agents incorporated in photographic elements of this invention was evaluated in comparison to photographic elements using comparative UV absorbing compounds. The coating format for comparative compositions as well as inventive compositions was as follows:

| | |
| --- | --- |
| Gel | 1.35 g/m$^2$ |
| BVSME* | 1.75% by weight of total gel |
| Gel | 1.40 g/m$^2$ |
| UV Absorbing Agent | 2.16 mmole/m$^2$ |
| | Cellulose Triacetate Film Support |

*BVSME - Bis (vinylsulfonyl methyl) ether.

The light stability of the above coatings was evaluated using the typical Xenon fadeometer exposure with Xe arc lamp as a light source at 25° C. for four weeks. The samples were irradiated at a distance such that irradiance on the sample was 50 Klux Daylight (315–700 nm) (known as "HID" test). The UV absorption spectrum of each sample was taken both before and after irradiation, and the % loss of the absorbance at 360 nm was used as an index of light stability. (For HID and HIS explanations, see Lewis R. Koller, Ultraviolet Radiation. John Wiley & Sons, Inc., N.Y., N.Y., 1965). The results are shown in Table 2.

TABLE 2

Intrinsic Light Stability of UV Absorbers

| Sample No. | % Loss at 360 nm | Remark |
| --- | --- | --- |
| C-1 | 9.5 | Comparison |
| CP-1 | 18.0 | Comparison |
| CP-2 | 15.3 | Comparison |
| CP-3 | 16.0 | Comparison |
| IP-1 | 4.0 | Invention |

Table 2 demonstrates that photographic elements of this invention incorporating polymeric UV absorbers of the present invention have better light stability over the comparative examples.

Example 2

Photographic elements in the form of color photographic paper, were prepared with the layer arrangement shown below. Experiments were conducted to determine the density at the unexposed area (that is, fresh Dmin), light-induced yellowing by HIS test (50 Klux Daylight exposure with light of 280–700 nm), as well as on light-induced discoloration of magenta image dye. Elements of the present invention incorporating polymeric UV absorbers of formula (I), as well as elements incorporating the comparative UV absorber compositions C-1 and CP-1 through CP-3, were tested.

| Layer No. | Layer Name | Ingredients | g/m$^2$ unless otherwise indicated |
| --- | --- | --- | --- |
| 8 | Protective Layer | 1.35 | Gelatin |
| | | BVSME @ 1.75% by weight of total gelatin laydown | |
| 7 | UV Layer | 1.40 | Gelatin |
| | | 2.16 mmole | UV Absorber |
| 6 | Interlayer | 0.0216 | Scavenger 1 |
| | | 1.08 | Gel |
| 5 | Cyan Layer | 1.08 | Gelatin |
| | | 0.424 | Cyan Coupler |
| | | 0.0058 | Scavenger 1 |
| | | 0.180 | Red Sensitized AgCl Emulsion |
| | | 0.232 | Coupler Solvent |
| 4 | Interlayer | 0.702 | Gelatin |
| | | 0.0434 | Scavenger 1 |
| 3 | Magenta Layer | 1.24 | Gelatin |
| | | 0.390 | Magenta Coupler |
| | | 0.207 | Magenta Stabilizer |
| | | 0.286 | Green Sensitized AgCl Emulsion |
| | | 0.154 | Coupler Solvent |
| 2 | Interlayer | 0.756 | Gelatin |
| | | 0.0945 | Scavenger 1 |
| 1 | Yellow Layer | 1.51 | Gelatin |
| | | 0.735 | Yellow CouplerBlue |
| | | 0.255 | Sensitized AgCl Emulsion |
| | | 0.0095 | Scavenger 2 |
| Support | Sublayer 1 | Resin Coat: Titanox and Optical Brightener Dispersed in Polyethylene | |
| | Sublayer 2 | Paper | |
| | Sublayer 3 | Resin Coat: Polyethylene | |

All couplers, scavenger, and image stabilizers are co-dispersed in di-butyl phthalate (Coupler Solvent) by the conventional colloidal milled process. The structures of the foregoing are as follows:

MAGENTA COUPLER
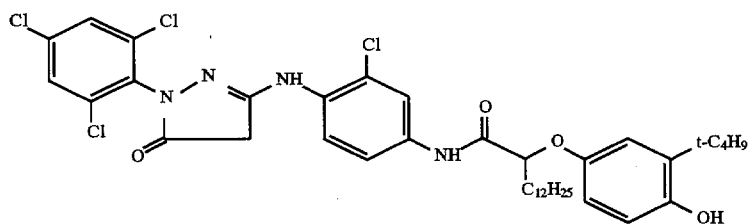
YELLOW COUPLER
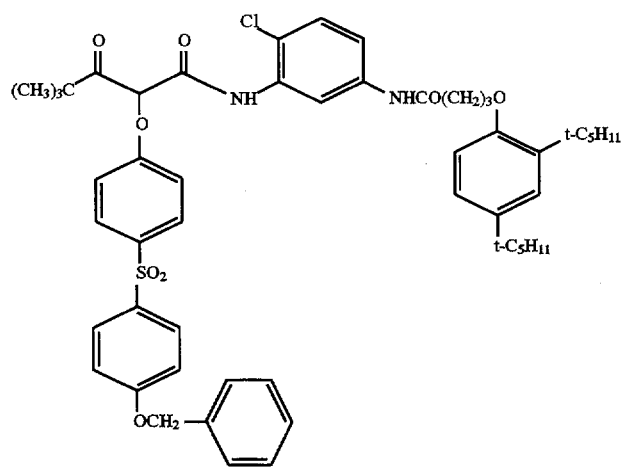
CYAN COUPLER
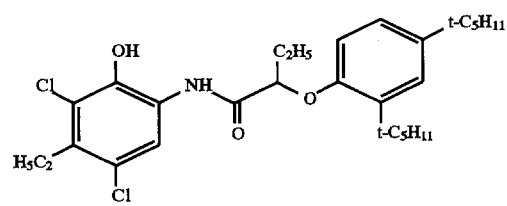
SCAVENGER 1
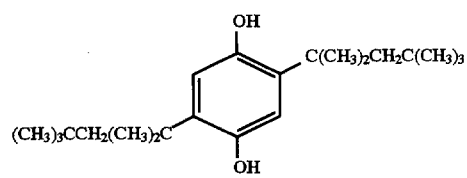
SCAVENGER 2
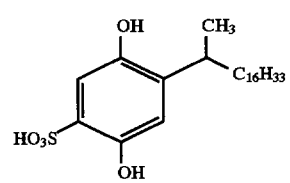

STABILIZER

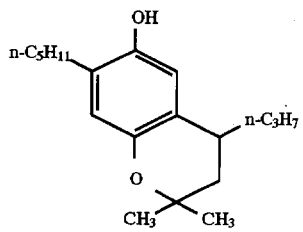

The photographic papers with the arrangement described above were processed by the well-known RA-4 process (see Research Disclosure 1, p. 535). Fresh Dmin offered by inventive polymer IP-1 is equivalent to that observed with comparative C-1 and is not of a concern. But particularly more magenta image dye stability and desirably lower light-induced yellow density are major advantages of the photographic elements of the present invention.

Image Dye Stability and Light Induced Yellowing

Photographic elements with the above layer structure were exposed with a step tablet wedge to three different colors (red, green, blue) on a sensitometer and subsequently processed by the RA-4 process to provide cyan, magenta, and yellow colors. The samples were subjected to a fading test with a Xenon lamp with filtered glass (50Klux), as described in Example 1. Dye density loss from the original density of 1.0 was measured and the data was used as the index for the image dye stability. Since the human eye is most sensitive to magenta color, the magenta dye stability is the most important among these three dyes. The difference in residual magenta dye density compared to C-1 is illustrated in Table 3. Blue Dmin increases obtained on four-week HIS exposure are also illustrated in Table 3. Another important property of the photographic paper is the whiteness or so-called blue Dmin of the paper on the unexposed area. Upon irradiation with HIS light, the blue Dmin usually increases due to the photochemical reaction of the residual couplers. The blue density increase of the photographic paper on the unexposed area before and after the light irradiation were measured. The lower values of these parameters contribute to improved photographic performance of polymeric UV absorbers in the photographic elements.

| Photographic properties | Sample IP-1 | Sample C-1 | Sample CP-1 | Sample CP-2 | Sample CP-3 | Remark |
|---|---|---|---|---|---|---|
| Changes in Blue Dmin from 4-weeks HIS test compared to C-1 | −0.026 | 0.000 | −0.008 | +0.024 | +0.005 | Lower is better |
| Changes in Magenta Dye Density from 4-week HID test compared to C-1 | +0.04 | 0.00 | −0.04 | +0.01 | +0.02 | Higher is better |

Table-3 clearly shows that the photographic elements of the present invention containing polymeric UV absorbers of the required type, particularly containing IP-1, have better image dye stability and lower light-induced yellow density than the comparative examples. It is clear that a sec—OH group present in the polymerizable fragment of CP-3 makes it a poorer performer in photographic element than that observed by inventive UV polymer IP-1, even though both have common polymerizable methacrylate group in their respective monomers.

The advantages of photographic elements of the present invention which use the required polymeric UV absorbers, include: greater intrinsic light stability, better magenta image dye stability, and lower light-induced yellow density, and lower (better) fresh blue Dmin.

The invention has been described in detail with particular reference to preferred embodiments. However, it will be understood that variations and modifications can be effected within the spirit and scope of the invention.

We claim:

1. A photographic element comprising a light sensitive portion and an ultraviolet absorbing polymer comprising repeating units of a 2'-hydroxphenyl benzotriazole wherein the light sensitive portion comprises a light sensitive silver halide emulsion layer, and wherein the 2'-hydroxyphenyl benzotriazole repeating units of the ultraviolet absorbing polymer are of formula (I):

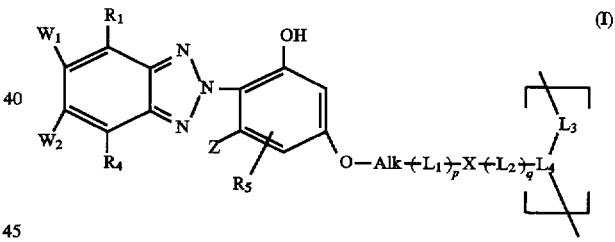

wherein:

p and q are, independently, 0 or 1;

$R_1$, $R_4$, $W_1$, $W_2$ and $R_5$ are, independently, H, halogen, cyano, carboxy group, carbamoyl group, sulfoxido group, sulfonyl group, sufonato group, sulfonamido group, alkyl group, alkoxy group, aryl group, heteroaryl group, or aryloxy group, or any two or more of $R_1$, $R_4$, $W_1$ and $W_2$ may together form an alicyclic, aromatic or heteroaromatic group; provided that at least $W_1$ or $W_2$ is halogen, cyano, carboxy or sulfonyl and that when $R_5$, is in the 3' position of the phenyl ring, $R_5$, is H;

Z is H or an OH;

Alk is an alkylene group;

$L_1$ and $L_2$ are, independently, bivalent linking groups;

X is O, sulfur group or an amino group;

$L_3$ is a methylene group and $L_4$ is a methine group; and wherein (i) the 4'-substituent does not have any —NH—, —OH or —SH substituents, and is of the formula:

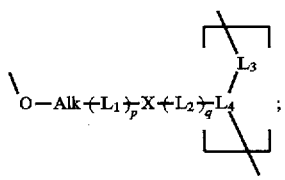

(ii) there is no substituent in the Y position of the hydroxyphenyl group;

(iii) $L_1$, is selected from: an alkylene group or an alkylene group interrupted by 1 to 5 heteroatoms selected from O, N and S; or a group of the formula

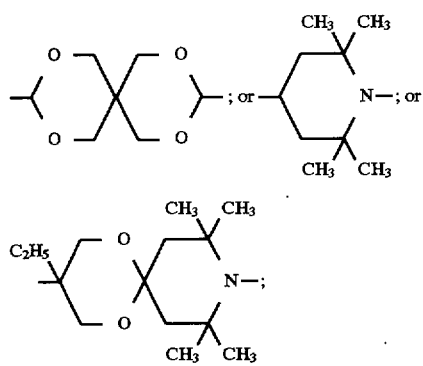

and (iv) $L_2$ is selected from: an alkylene group or an alkylene group interrupted by 1 to 5 heteroatoms selected from O, N and S or by carbonyl; CO; CONH(CH$_2$)$_3$NHCO; benzenesulfonyl; (CH$_2$)$_n$CO; and (CH$_2$OCH$_2$)$_n$CO, where n is 1–8.

2. A photographic element according to claim 1 wherein $W_2$ is Cl.

3. A photographic element according to claim 1 wherein p is 0 and X is O.

4. A photographic element comprising a light sensitive silver halide and an ultraviolet absorbing polymer comprising repeating units of formula (IC) or (ID):

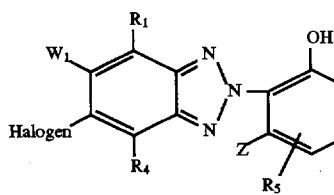 (IC)

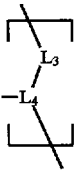

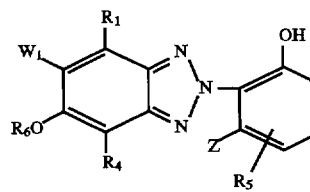 (ID)

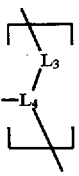

wherein:

p and q are, independently, 0 or 1;

$R_1$, $R_4$, $W_1$ and $R_5$ are, independently, H, halogen, cyano, carboxy group, carbamoyl group, sulfoxido group, sulfonyl group, sufonato group, sulfonamido group, alkyl group, alkoxy group, aryl group, heteroaryl group, or aryloxy group, or $R_1$ and $W_1$ may together form an alicyclic, aromatic or heteroaromatic group with the proviso that when $R_5$, is in the 3' position of the phenyl 1 ring $R_5$, is H;

$R_6$ is an alkyl group;

Z is H or an OH;

Alk is an alkylene group;

$L_1$ and $L_2$ are, independently, bivalent linking groups;

X is O, sulfur group or an amino group;

$L_3$ is a methylene group and $L_4$ is a methine group; and provided that the group

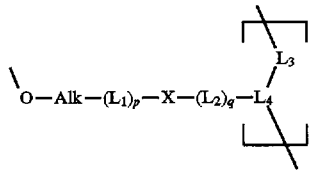

does not have any —NH—, —OH or —SH substituents; there is no substituent in the 3' position of the hydroxyphenyl group; $L_1$ is selected from: an alkylene group; or an alkylene group interrupted by 1 to 5 heteroatoms selected from O, N and S; or a group of the formula

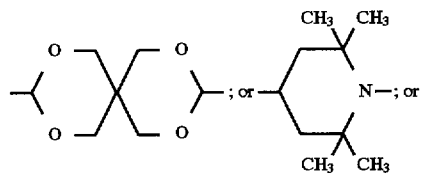

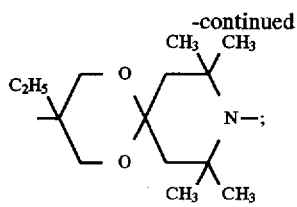

and L₂ is selected from: an alkylene group or an alkylene group interrupted by 1 to 5 heteroatoms selected from O, N and S or by carbonyl; CO; CONH(CH₂)₃NHCO; benzenesulfonyl; (CH₂)$_n$CO; (CH₂OCH₂)$_n$CO (where n is 1-8) and

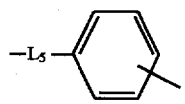

where L₅ is carbonyl or SO₂.

5. A photographic element according to claim 4 wherein q is 1 and —L₂— is:

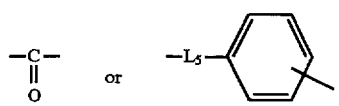

where L₅ is carbonyl or SO₂.

6. A photographic element according to claim 4 wherein the ultraviolet absorbing polymer comprises repeating units of formula (IC).

7. A photographic element comprising a light sensitive silver halide emulsion layer and an ultraviolet absorbing polymer comprising repeating units of formula (IC') or (ID'):

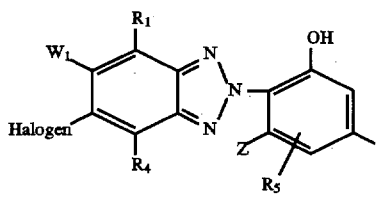

wherein:

p is 0 or 1;

R₁, R₄, W₁ and R₅ are, independently, H, halogen, cyano, carboxy group, carbamoyl group, sulfoxido group, sulfonyl group, sufonato group, sulfonamido group, alkyl group, alkoxy group, aryl group, heteroaryl group, or aryloxy group, or R₁ and W₁ may together form an alicyclic, aromatic or heteroaromatic group with the proviso that when R₅ is in the 3' position of the phenyl ring R₅, is H;

R₆ is an alkyl group;

Z is H or an OH;

Alk is an alkylene group;

L₁ is a bivalent linking group selected from: an alkylene group; or an alkylene group interrupted by 1 to 5 heteroatoms selected from O, N and S; or a group of the formula

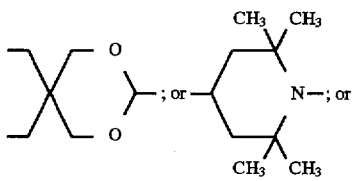

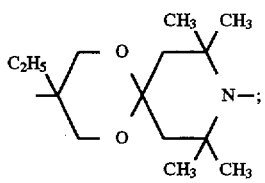

X is O, sulfur group or an amino group;

L₃ is a methylene group and L₄ is a methine group; and provided that the group

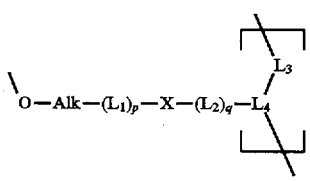

does not have any —NH—, —OH or —SH substituents.

8. A photographic element according to claim 7 wherein the repeating units of formula (IC') or (ID') are of the following formula:

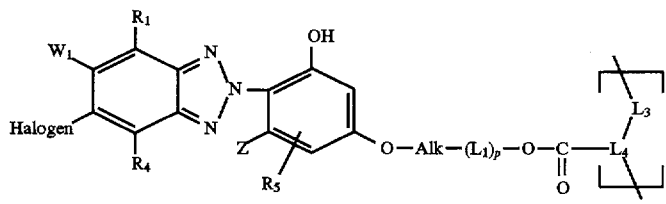

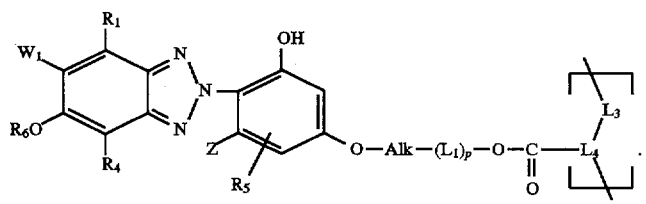

9. A photographic element according to claim 7 wherein the repeating units of formula (IC') or (ID') are of the following formula:

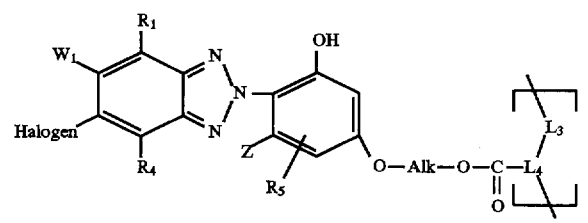

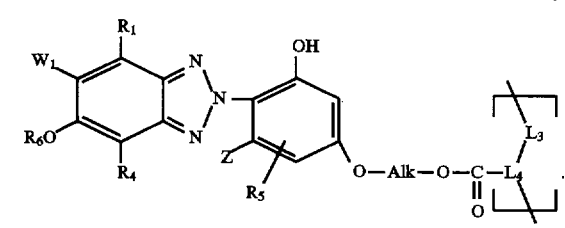

10. A photographic element according to claim 7 wherein the ultraviolet absorbing polymer comprises repeating units of formula (IC').

11. A photographic element according to claim 10 wherein "Alk" is an unsubstituted alkylene or an alkylene substituted by halogen, alkyl, alkoxy, alkyl sulfide, aryl, aryloxy, or dialkyl amino.

12. A photographic element according to claim 10 wherein the repeating units of formula (IC') are of the formula:

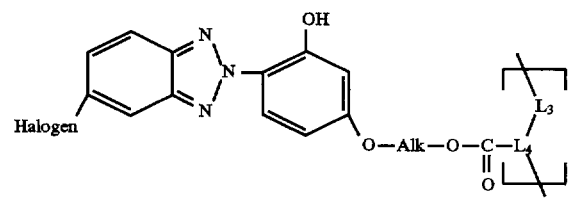

13. A photographic element according to claim 1 wherein $L_4$ is $CCH_3$ or CH.

14. A photographic element according to claim 1 wherein $L_3$ is $CH_2$.

15. A photographic element according to claim 12 wherein "Alk" is $CH_2CH_2$.

16. A photographic element according to claim 15 wherein "Halogen" is chlorine.

17. A photographic element according to claim 1, the element comprising at least one light sensitive silver halide emulsion layer and a non-light sensitive layer, wherein the ultraviolet absorbing polymer is located in the non-light sensitive layer.

18. A photographic element according to claim 17 wherein the non-light sensitive layer containing the ultraviolet absorbing polymer is located above all light sensitive layers.

19. A photographic element according to claim 1 comprising at least one gel layer, the ultraviolet absorbing polymer being incorporated in the gel layer in the form of a latex.

20. A photographic element according to claim 2 wherein the ultraviolet absorbing polymer is a copolymer.

21. A photographic element according to claim 20 wherein the ultraviolet absorbing polymer is a copolymer having repeating units of either the formula:

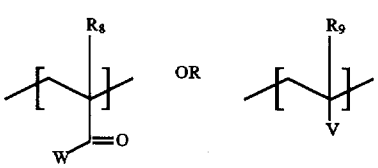

wherein: W is an amino group, alkoxy group, or phenoxy group; V is a phenyl group; and $R_8$ and $R_9$ are H or a 1 to 6 carbon atom alkyl group.

22. A photographic element according to claim 1, wherein the ultraviolet absorbing polymer comprises monomeric units of formula (I) and other monomeric units and wherein the ratio of monomeric units of formula (I) to the other monomeric units is between 10:1 to 1:10.

23. A photographic element according to claim 1 wherein the ultraviolet absorbing polymer is present in the photographic element in an amount of between 0.2 g/m² and 10 g/m².

24. A photographic element according to claim 1 wherein the repeating units of formula (I) are of formula (IA):

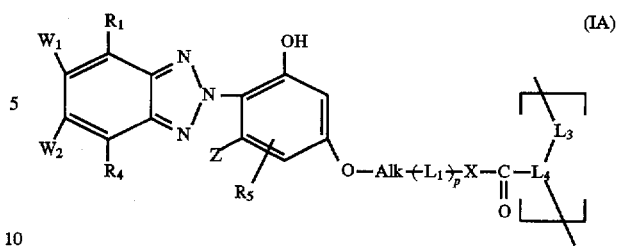

wherein $R_1$, $R_4$, $R_5$, $W_1$, $W_2$, $L_1$, $L_3$, $L_4$ and p are as defined in claim 2.